United States Patent
Shiro et al.

(10) Patent No.: US 9,954,912 B2
(45) Date of Patent: Apr. 24, 2018

(54) APPARATUS, SYSTEM, AND METHOD OF CONTROLLING TRANSMISSION OF DATA

(71) Applicants: Hideki Shiro, Kanagawa (JP); Takuya Imai, Tokyo (JP); Kenichiro Morita, Tokyo (JP); Shoh Nagamine, Kanagawa (JP)

(72) Inventors: Hideki Shiro, Kanagawa (JP); Takuya Imai, Tokyo (JP); Kenichiro Morita, Tokyo (JP); Shoh Nagamine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 14/855,784

(22) Filed: Sep. 16, 2015

(65) Prior Publication Data
US 2016/0094595 A1 Mar. 31, 2016

(30) Foreign Application Priority Data

Sep. 29, 2014 (JP) .................. 2014-197785
Sep. 9, 2015 (JP) .................. 2015-177383

(51) Int. Cl.
*H04L 29/06* (2006.01)
*H04L 29/08* (2006.01)

(52) U.S. Cl.
CPC ........ *H04L 65/403* (2013.01); *H04L 65/1069* (2013.01); *H04L 67/327* (2013.01)

(58) Field of Classification Search
CPC .. H04L 65/403; H04L 65/1069; H04L 67/327
See application file for complete search history.

(56) References Cited

U.S. PATENT DOCUMENTS

| | | |
|---|---|---|
| 2012/0002003 A1 | 1/2012 | Okita et al. |
| 2012/0182381 A1* | 7/2012 | Abate ................ H04L 12/1822 348/14.03 |
| 2012/0221702 A1* | 8/2012 | Umehara ............ H04L 12/1818 709/223 |
| 2013/0335514 A1 | 12/2013 | Umehara et al. |
| 2014/0055555 A1 | 2/2014 | Imai |
| 2014/0118475 A1 | 5/2014 | Nagamine et al. |
| 2014/0240450 A1 | 8/2014 | Morita et al. |
| 2014/0244460 A1 | 8/2014 | Imai et al. |
| 2014/0354767 A1 | 12/2014 | Imai |
| 2014/0362718 A1 | 12/2014 | Nagamine et al. |
| 2014/0368410 A1 | 12/2014 | Imai et al. |

FOREIGN PATENT DOCUMENTS

| | | |
|---|---|---|
| JP | 2005-064860 | 3/2005 |
| JP | 2008-028784 | 2/2008 |
| JP | 2012-075073 | 4/2012 |
| JP | 2012-191598 | 10/2012 |

* cited by examiner

*Primary Examiner* — Jae Y Lee
(74) *Attorney, Agent, or Firm* — Oblon, McClelland, Maier & Neustadt, L.L.P.

(57) ABSTRACT

A communication terminal is controlled such that the communication terminal does not transmit content data from the communication terminal to one or more communication terminals through a first session, but transmits content data from the communication terminal to a selected communication terminal of the one or more communication terminals through a second session after the second session is established with the selected communication terminal.

18 Claims, 16 Drawing Sheets

FIG. 7A

TRANSMISSION MANAGEMENT TABLE

| STATE | FUNCTION | TRANSMISSION CAPABILITY (IMAGE DATA) | TRANSMISSION CAPABILITY (SOUND DATA) |
|---|---|---|---|
| ABSENT | GUEST | NOT CAPABLE | NOT CAPABLE |
| WAITING | GUEST | CAPABLE | NOT CAPABLE |
| WAITING | OPERATOR | NOT CAPABLE | NOT CAPABLE |
| RESPONDING | GUEST·OPERATOR | CAPABLE | CAPABLE |
| RESPONDED | GUEST | NOT CAPABLE | NOT CAPABLE |

FIG. 7B

AUTHENTICATION MANAGEMENT TABLE

| CONTACT ID | PASSWORD |
|---|---|
| 01aa | aaaa |
| ... | ... |
| 01db | dbdb |
| ... | ... |

FIG. 7C

TERMINAL MANAGEMENT TABLE

| CONTACT ID | COUNTERPART NAME (TERMINAL NAME) | STATE | TERMINAL IP ADDRESS | FUNCTION |
|---|---|---|---|---|
| 01aa | BEIJING AA TERMINAL | WAITING | 1.2.1.3 | GUEST |
| ... | ... | ... | ... | ... |
| 01ba | SHANGHAI BA TERMINAL | WAITING | 1.2.2.3 | GUEST |
| ... | ... | ... | ... | ... |
| 01cb | TOKYO CB TERMINAL | WAITING | 1.3.1.4 | GUEST |
| ... | ... | ... | ... | ... |
| 01db | CALL CENTER: DB TERMINAL | WAITING | 1.3.2.4 | OPERATOR |
| ... | ... | ... | ... | ... |

FIG. 7D

APPLICATION USE MANAGEMENT TABLE

| APPLICATION ID / CONTACT ID | a001 | a002 | a003 | a004 |
|---|---|---|---|---|
| 01aa | ON | ON | OFF | OFF |
| ... | ... | ... | ... | ... |
| 01ac | ON | ON | OFF | OFF |
| ... | ... | ... | ... | ... |

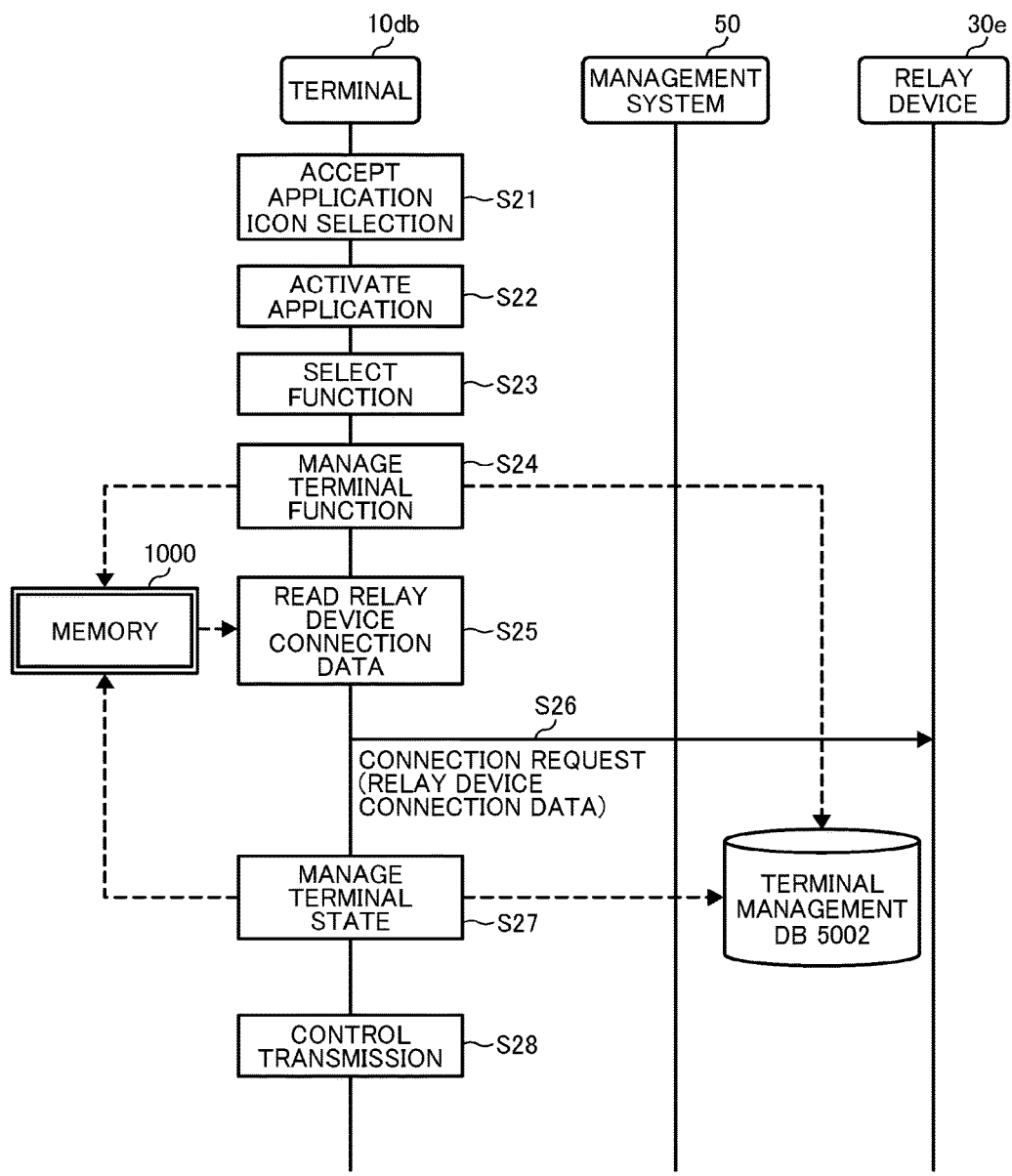

APPARATUS, SYSTEM, AND METHOD OF CONTROLLING TRANSMISSION OF DATA

CROSS-REFERENCE TO RELATED APPLICATIONS

This patent application is based on and claims priority pursuant to 35 U.S.C. § 119(a) to Japanese Patent Application Nos. 2014-197785, filed on Sep. 29, 2014, and 2015-177383, filed on Sep. 9, 2015, in the Japan Patent Office, the entire disclosure of which is hereby incorporated by reference herein.

BACKGROUND

Technical Field

The present invention generally relates to controlling transmission of content data.

Description of the Related Art

With the increased need for reduction in business trip costs and time in recent years, communication systems that communicate via a communication network such as the Internet or a dedicated line are widely spread. In the communication systems, content data such as image data or sound data are transmitted or received among a plurality of communication terminals to carry out videoconference.

As one example, the communication systems may be used at a call center. In such case, an operator at a call center usually selects one user from among a plurality of users who are waiting to be answered. With this selection of the user, a communication terminal operated by the operator establishes a session with a communication terminal operated by the selected user to start communication. When the communication ends, the communication terminal of the operator ends the previously held session, and establishes another session with the other communication terminal operated by the other user to start communication. Through this process, the operator is able to answer the plurality of users, one by one.

SUMMARY

Example embodiments of the present invention include a communication terminal, which is controlled such that the communication terminal does not to transmit content data from the communication terminal to one or more communication terminals through a first session, but transmits content data from the communication terminal to a selected communication terminal of the one or more communication terminals through a second session after the second session is established with the selected communication terminal.

Other example embodiments of the present invention include a communication system including the above-described communication terminal, and at least the second communication terminal.

Other example embodiments of the present invention include a method of controlling transmission of content data from one communication terminal to another, and a non-transitory recording medium storing a data transmission control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A is an illustration of an example data structure of a transmission management table;

FIG. 7B is an illustration of an example data structure of an authentication management table;

FIG. 7C is an illustration of an example data structure of a terminal management table;

FIG. 7D is an illustration of an example data structure of an application use management table;

FIG. 11 is a data sequence diagram illustrating operation of processing a request for participating in a first session, according to an embodiment of the present invention;

Figure 1:
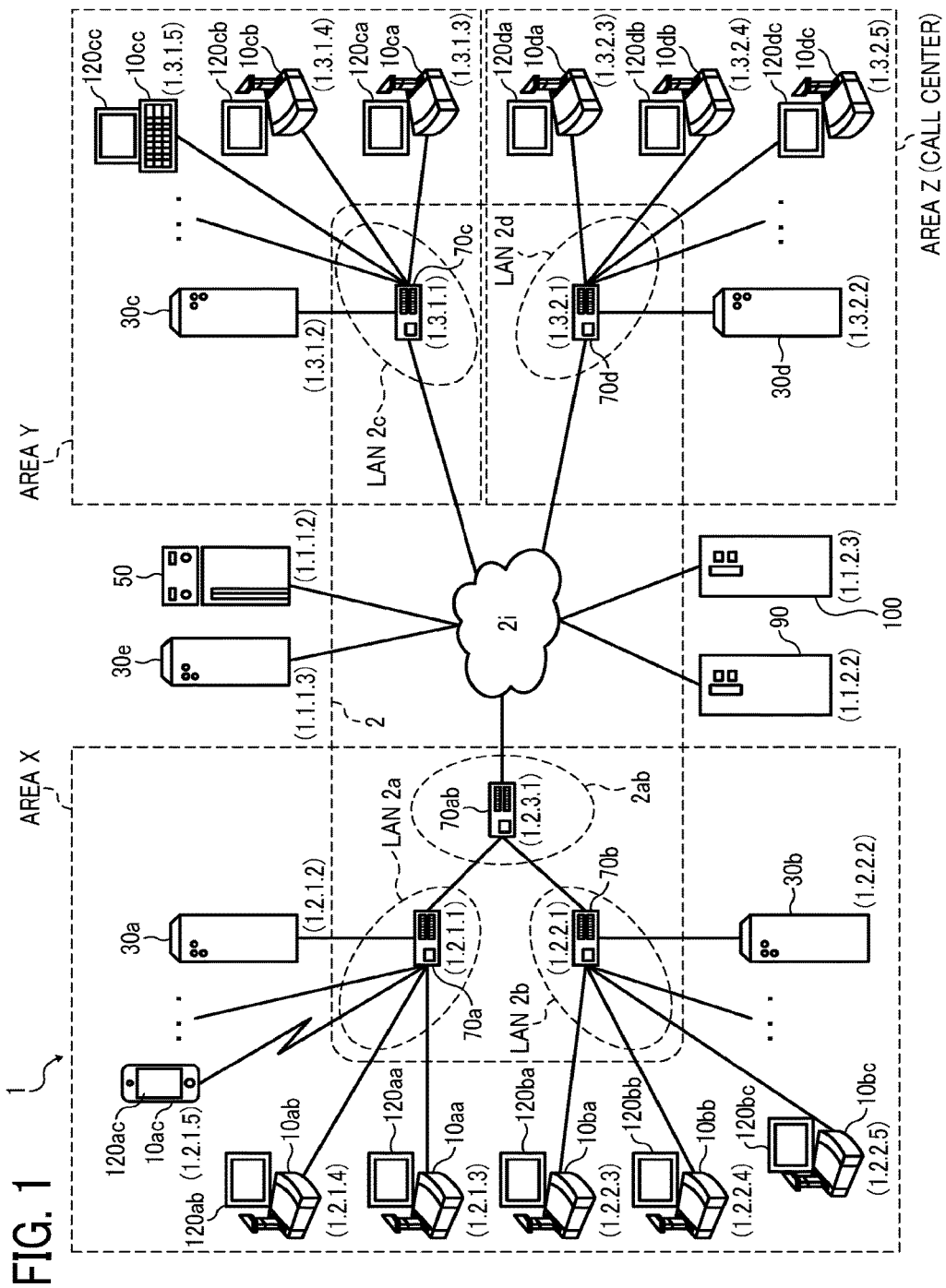
FIG. 1 is a schematic diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, an embodiment of the present invention is described. In the following, a "communication terminal" may simply be referred to as a "terminal", and a "communication management system" may simply be referred to as a "management system".

<Configuration of Communication System>

FIG. 1 is a schematic diagram illustrating a configuration of a communication system according to an example embodiment of the present invention. As illustrated in FIG. 1, the communication system 1 includes a plurality of terminals (10aa, 10ab, . . . ), a plurality of displays (120aa, 120ab, . . . ) for respective terminals (10aa, 10ab, . . . ), a plurality of relay devices (30a, 30b, 30c, 30d, 30e), a management system 50, a program providing system 90, and a maintenance system 100. The communication system 1 controls communication of content data, such as image data and sound data, to carry out videoconference among a plurality of remotely located sites. One or more of a plurality of routers (70a, 70b, 70c, 70d, 70ad) is selected to relay content data via an optical route.

The terminals (10aa, 10ab, 10ac, . . . ), the relay device 30a, and the router 70a are connected through a LAN 2a to be communicable with each other. The LAN 2a and the LAN 2b are connected through a dedicated line 2ab including the router 70ab to be communicable with each other. The LAN 2a, the LAN 2b, and the dedicated line 2ab are provided in an area X. Any one of these devices may be connected directly to the Internet 2i, without using the dedicated line.

The terminals (10ca, 10cb, 10cc, . . . ), the relay device 30c, and the router 70c are connected through the LAN 2c to be communicable with each other through the LAN 2c. The LAN 2c is provided in an area Y.

The terminals (10da, 10db, 10dc, . . . ), the relay device 30d, and the router 70d are connected through the LAN 2d to be communicable with each other. The LAN 2d is provided in an area Z. The areas X, Y, and Z may be located within one country, or over different countries.

The areas X, Y, and Z are connected through the routers (70ab, 70c, and 70d) to the Internet 2i to be communicable. In this example, the area Z is a location where a call center is provided. In this disclosure, any one of the terminals 10 (10da, 10db, 10dc, . . . ) located at the call center may be referred to as the call center terminal 10d. As described below, the terminal 10 connects with at least one terminal 10d (10da, 10db, 10dc, . . . ) at the call center to have reception services.

In the following, any arbitrary terminal of the plurality of terminals (10aa, 10ab, . . . ) is referred to as the terminal 10. Any arbitrary display of the plurality of displays (120aa, 120ab, . . . ) is referred to as the display 120. Any arbitrary relay device of the relay devices (30a, 30b, 30c, 30d, 30e) is referred to as the relay device 30. Any arbitrary router of the plurality of routers (70a, 70b, 70c, 70d, 70ab) is referred to as the router 70.

The management system 50, the program providing system 90, and the maintenance system 100 are connected to the Internet 2i. The management system 50, the program providing system 90, and the maintenance system 100 may be provided in any of the areas X, Y, and Z, or any area other than the areas X, Y, and Z.

In this example, the communication network 2 includes the LAN (2a, 2b, 2c, 2d), the dedicated line 2ab, and the Internet 2i. The communication network 2 may not only include a wired network, but also a wireless network such as a network in compliance with WiFi (Wireless Fidelity) or Bluetooth, or a mobile phone network.

In FIG. 1, four digits shown below each one of the terminals 10, the relay devices 30, the management system 50, the routers 70, the program providing system 90, and the maintenance system 100 indicate a simplified expression of IP address that is assigned to each device capable of functioning as a communication device. For simplicity, the IP address is expressed in Internet Protocol version 4 (IPv4), but the IP address may be expressed in IPv6 instead.

When application is executed, the terminals 10 transmit or receive content data such as image data and sound data, to carry out communication among the users. More specifically, the terminal 10 transmits or receives content data using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

<Hardware Configuration>

Figure 2:
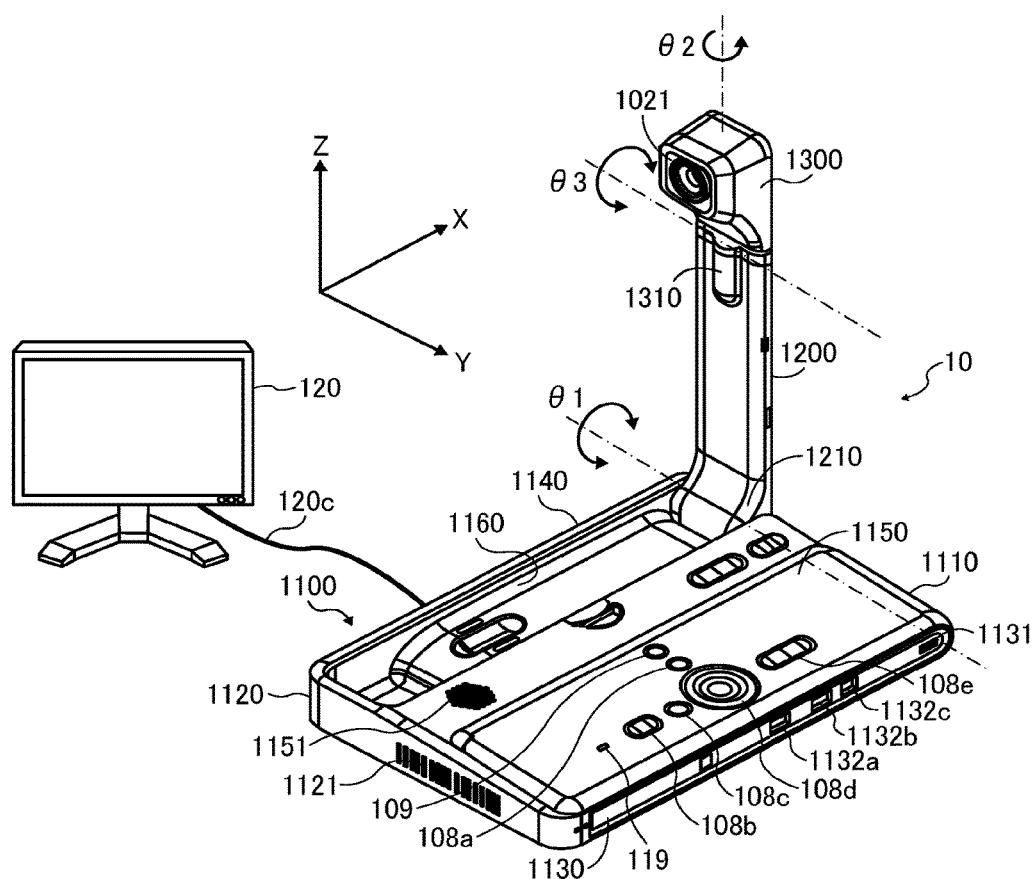
FIG. 2 is an external view illustrating a terminal of the communication system of FIG. 1.

Now, a hardware configuration of the communication system 1 is explained. FIG. 2 is an external view illustrating the terminal 10 according to an example embodiment of the present invention. The terminal 10 includes a casing 1100, an arm 120, and a camera housing 1300. The casing 1100 includes a front side wall 1100 having a plurality of air intake holes formed over the nearly entire surface of the intake surface, and a back side wall 1120 having a plurality of exhaust holes over the nearly entire surface of the exhaust surface 1121. When a cooling fan in the casing 1100 is driven, air flows in through the intake holes of the intake surface and out through the exhaust holes of the exhaust surface 1121. The casing 1100 further includes a right side wall 1130 formed with a sound pickup hole 1131. Through the sound pickup hole 1131, a microphone 114 of the terminal 10 is able to catch sounds such as human voice or any sound including noise.

The casing 1100 has an operation panel 1150, which is provided at a front surface toward the right side wall 1130. The operation panel 1150 includes a plurality of operation keys 108a to 108e, a power switch 109, and a plurality of sound output holes 1151. Through the sound output holes 1151, a speaker 115 of the terminal 10 is able to output sounds such as sounds generated based on human voice. The casing 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an external device connection I/F 118. The casing 1100 further includes a left side wall 1140, which is provided with a connection port to connect the external display 120 to the display I/F 117 through a cable 120c.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210. With the torque hinge 1210, the arm 1200 can be rotated in directions of up and down with respect to the casing 1100, while making a tilt angle θ1 of up to 135 degrees. FIG. 2 illustrates the case where the tilt angle θ1 is 90 degrees.

The camera housing 1300 incorporates therein the camera 112 that takes an image of an object. The object may be a part of a user, document, or a room where the terminal 10 is located. The camera housing 1300 is provided with a torque hinge 1310. The camera housing 1300 is attached to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

Note that the external view illustrated in FIG. 2 is only exemplary and the appearance is not restricted thereto. The communication terminal 10 may be, for example, a general-purpose personal computer (PC), a portable phone, a projector, an electronic whiteboard, or a digital signage (See 10ac and 10cc in FIG. 1). When the terminal 10, for example, when implemented by a computer, is not provided with a microphone or a camera, any external microphone or external camera may be connected with the terminal 10. When the terminal 10 is implemented by the PC or the portable phone, the terminal 10 is connected to the Internet 2i through a wireless network such as a wireless LAN or mobile phone network. Further, when the terminal 10 is implemented by PC, such PC may be previously installed with application for enabling the PC to function as the videoconference terminal 10 of FIG. 2 as described below.

Since the communication management system 50, the program providing system 90, and the maintenance system 100 has the same appearance as that of a general server computer, a description of the appearance thereof is omitted.

Figure 3:
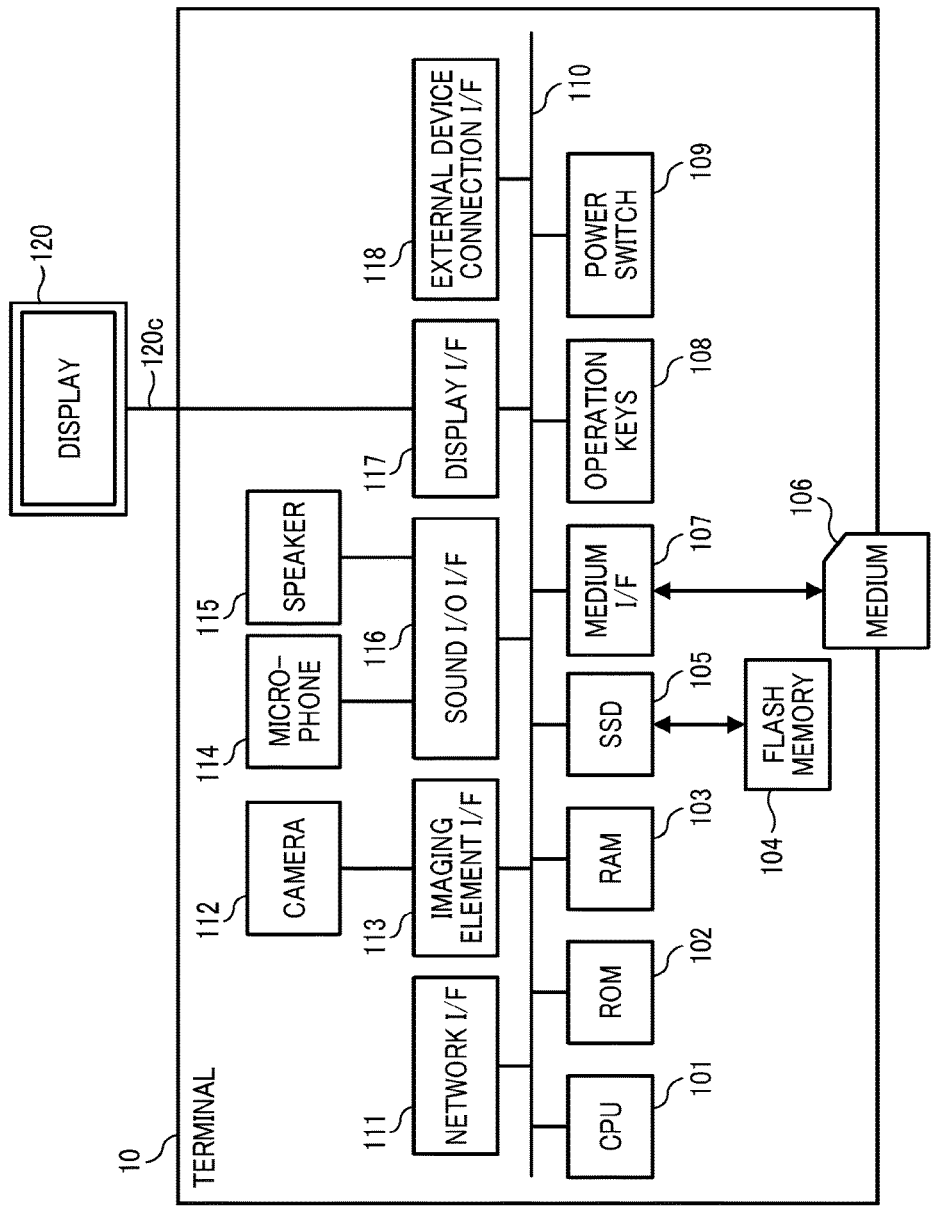
FIG. 3 is a schematic block diagram illustrating a hardware configuration of the terminal of FIG. 2.

FIG. 3 illustrates a hardware configuration of the terminal 10 according to the embodiment of the present invention. The terminal 10 includes a central processing unit (CPU) 101 that controls entire operation of the terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 (such as a medium drive) that controls reading/writing (storage) of data from/to a recording medium 106 such as a flash memory or an IC card, the operation keys 108 operated in the case of, for example, selecting a counterpart terminal of the terminal 10, the power switch 109 for turning on/off the power of the terminal 10, and a network interface (I/F) 111 for transmitting data using the communication network 2.

The terminal 10 further includes the built-in camera 112 that captures an image of a subject and obtains image data under control of the CPU 101, an imaging element I/F 113 that controls driving of the camera 112, the built-in microphone 114 that receives a sound input, the built-in speaker 115 that outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable that is inserted into the connection port 1132 or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the terminal 10. The recording medium 106 can be any non-volatile memory that reads or writes data under control of the CPU 101, such that any memory such as an electrically erasable and programmable read-only memory (EEPROM) may be used instead of the flash memory 104.

Figure 4:
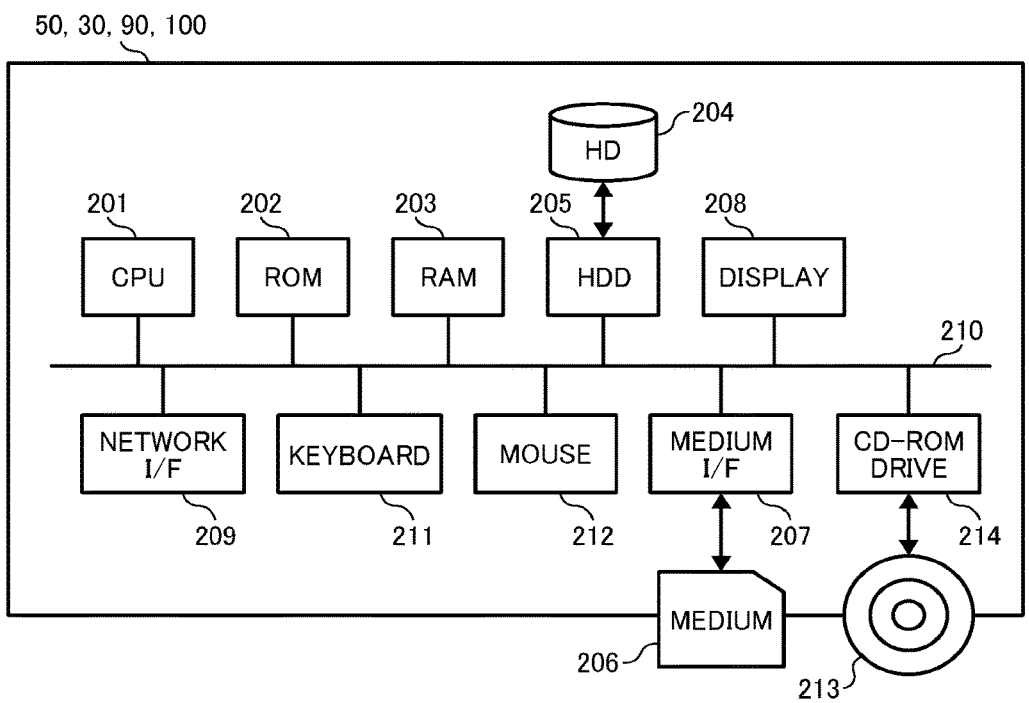
FIG. 4 is a schematic block diagram illustrating a hardware configuration of a management system, relay device, program providing system, or maintenance system of the communication system of FIG. 1.

FIG. 4 illustrates a hardware configuration of the management system 50 according to the embodiment. The management system 50 includes a CPU 201 that controls entire operation of the management system 50, a ROM 202 that stores a program used for driving the CPU 201 such as an IPL, a RAM 203 used as a work area for the CPU 201, the HD 204 that stores various types of data such as the transmission management program, a hard disk drive (HDD) 205 that controls reading/writing of various types of data from/to the HD 204 under control of the CPU 201, a medium I/F 207 (such as a medium drive) that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Since the relay devices 30, the program providing system 90, and the maintenance system 100 each have a hardware configuration that is the same as or similar to that of the above-described management system 50, a description thereof is omitted.

Figure 5:
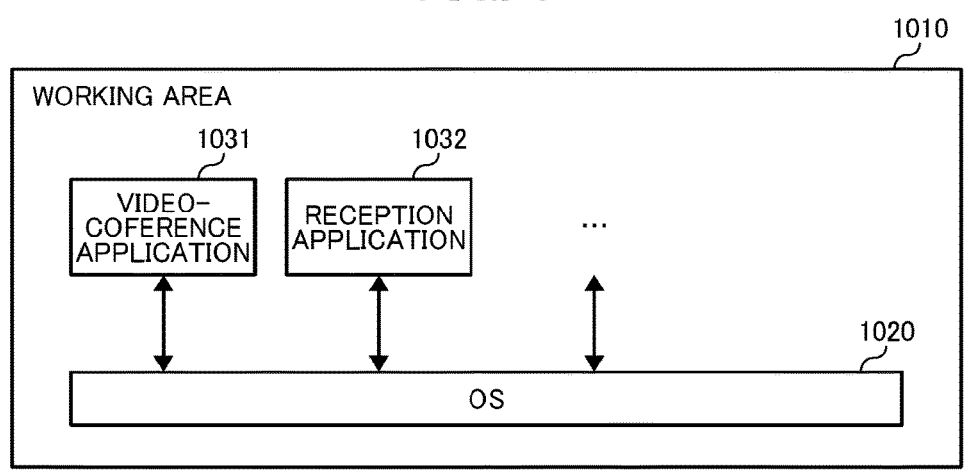
FIG. 5 is a schematic block diagram illustrating a software configuration of the terminal of FIG. 1.

FIG. 5 illustrates a software configuration of the terminal 10 according to the embodiment of the present invention. As illustrated in FIG. 5, the terminal 10 is installed with an OS 1020, videoconference application 1031, and reception application 1032, each of which operates on a work area 1010 of the RAM 103.

The OS 1020 is basic software that controls entire operation of the terminal 10 through providing basic functions. The videoconference application 1031 enables the terminal 10 to communicate with the other terminal 10 to carry out videoconference. The reception application 1032 enables the terminal 10 to communicate with the terminal 10d at the call center to have conversation (communication) with the operator at the call center.

In alternative to the above-described application, any other application may be installed on the terminal 10. For example, the program providing system 90 may store any desired application in its memory, and upon request from the terminal 10, transfer such application to be downloaded onto the terminal 10. Further, a plurality of types of videoconference application 1031 may be installed, such as application that differs in communications protocol.

<Functional Configuration of Communication System>

Figure 6:
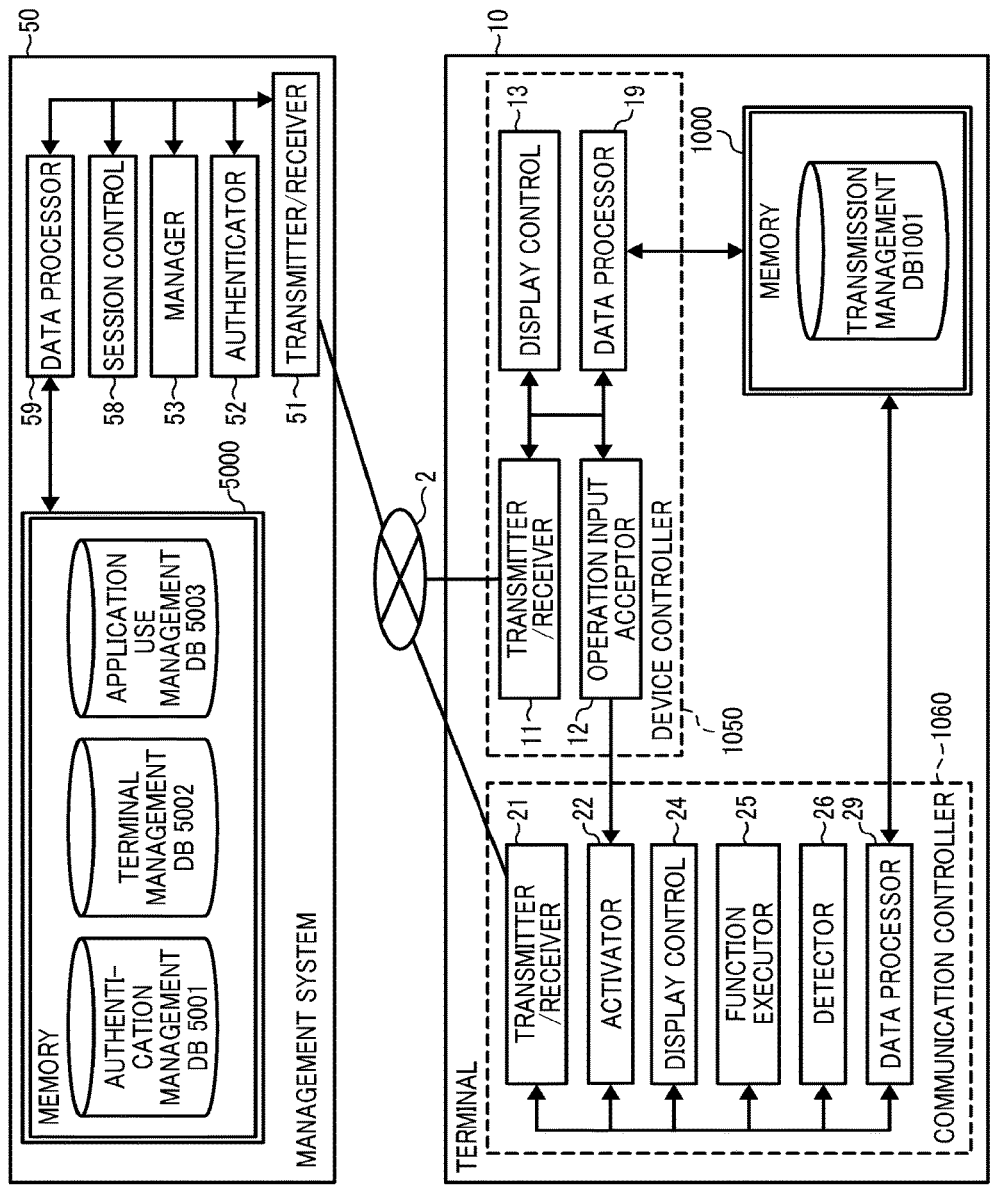
FIG. 6 is a schematic block diagram illustrating a functional configuration of the terminal and the management system of the communication system of FIG. 1.

Now, functional configuration of the communication system 1 is explained. FIG. 6 is a schematic block diagram illustrating a functional configuration of the terminal 10 and the management system 50 in the communication system 1. In FIG. 6, the terminal 10 and the management system 50 are connected through the Internet 2 to transmit or receive data.

<Functional Configuration of Terminal>

The terminal 10 includes a device controller 1050 and a communication controller 1060. The device controller 1050 is implemented with execution of the OS 1020. The communication controller 1060 is implemented with, for example, execution of the videoconference application 1031 or the reception application 1032.

The device controller 1050 includes a transmitter/receiver 11, an operation input acceptor 12, a display control 13, and a data processor 19. These elements in FIG. 6 correspond to a plurality of functions, which are executed according to the instructions of the CPU 101 (FIG. 3) that are generated according to application (such as the executed application) being loaded from the flash memory 104 onto the RAM 103.

The communication controller 1060 includes a transmitter/receiver 21, an activator 22, a display control 24, a function executor 25, a detector 26, and a data processor 29. These elements shown in FIG. 6 correspond to a plurality of functions, which are performed by the elements shown in FIG. 3 according to the instructions of the CPU 101 (FIG. 3) that are generated according to, for example, the videoconference application 1031 or the reception application 1032 being loaded from the flash memory 104 onto the RAM 103.

The terminal 10 further includes a memory 1000, which is implemented by the ROM 102, RAM 103, or flash memory 104 of FIG. 3. The memory 1000 has a storage area for each application, in which function information indicating a function of the local terminal 10 when executing that application is stored. The storage area of the memory 1000 for each application further stores state information indicating a state of the local terminal 10. The memory 1000 further stores relay device connection data to be used for connecting to the relay device 30, such as the relay device 30e. The relay device connection data includes an IP address of the relay device 30e, authentication information to be used for authentication, a port number, and a session ID for identifying a session such as a session "sed1" as described below. The memory 1000 further stores a plurality of databases (DBs) as described below.

(Transmission Management Table)

FIG. 7A is an illustration of an example data structure of a transmission management table. The memory 5000 stores a transmission management DB 1001, which may be implemented by the transmission management table of FIG. 7A. The transmission management table stores, in association with state information indicating a state of the terminal 10 and function information indicating a function being performed by the terminal 10 operating according to specific application, transmission capability information indicating whether the terminal 10 can transmit specific content data when the terminal 10 operating the associated function is in the associated state. The content data in this example includes image data and sound data. Further, the transmission management table of FIG. 7A indicates transmission capability of content data, for reception application 1032 that is installed at the terminal 10.

In this embodiment, the state information "absent" indicates that the user is not at the terminal 10. The state information "waiting" indicates that the user at the terminal 10 is waiting to start communication with a user at a counterpart terminal. The state information "responding" indicates that the user at the terminal 10 is communicating. The state information "responded" indicates that the user at the terminal 10 ends communication. The function information "operator" indicates that the terminal 10 operates according to the reception application with the function as an operator. The function information "guest" indicates that the terminal 10 operates according to the reception application with the function as a guest. Further, the transmission capability "capable" indicates that the terminal 10 performing the specific function and having the specific state is permitted to transmit data. The transmission capability "not capable" indicates that the terminal 10 performing the specific function and having the specific state is not permitted to transmit data, even though the terminal 10 can technically transmit data.

(Functional Configuration of Device Controller)

Next, functional configuration of the device controller 1050 of the terminal 10 is explained according to the embodiment of the present invention. In the following description of functional configuration of the device controller 1050 of the terminal 10, relationships with hardware elements for implementing the functional configuration of the device controller 1050 shown in FIG. 3 is also described.

The transmitter/receiver 11, which is implemented by instructions of the CPU 101 and the network I/F 111, transmits or receives various data (or information) to or from the counterpart terminal, each device or system, through the communication network 2.

The operation input acceptor 12, which may be implemented by instructions of the CPU 101, the operation keys (108a, 108b, 108c, 108d, 108e), and the power switch 109, receives various inputs or selections from the user.

The display control 13, which may be implemented by the instructions of the CPU 101 and the display I/F 117, controls transmission of image data transmitted from a communication counterpart to the display 120.

The data processor 19, which may be implemented by the instructions of the CPU 101 and the SSD 105, or the instructions of the CPU 101, stores various data in the memory 1000 or reads various data from the memory 1000.

(Functional Configuration of Communication Controller)

Next, functional configuration of the communication controller 1060 of the terminal 10 is explained according to the embodiment of the present invention. In the following description of functional configuration of the communication controller 1060 of the terminal 10, relationships of the hardware elements in FIG. 3 with the functional configuration of the communication controller 1060 in FIG. 6 is also described.

The transmitter/receiver 21, which may be implemented by the instructions of the CPU 101 and the network I/F 111, transmits or receives various data (or information) to or from the counterpart terminal, device, or system, through the communication network 2.

The activator 22, which may be implemented by instructions of the CPU 101, activates the communication controller 1060, in response to an activation request at the operation input acceptor 12, when the operation input 12 receives a user selection of application. More specifically, when the user selects activation of the videoconference application 1031, the communication controller 1060 is activated under control of the videoconference application 1031. When the user selects activation of the reception application 1032, the communication controller 1060 is activated under control of the reception application 1032.

The display control 24, which may be implemented by the instructions of the CPU 101 and the display I/F 117, controls transmission of image data to the display 120. Further, the display control 24 controls a user interface for display to the user, according to the selected application such as the videoconference application 1031 or the reception application 1032. The display control 24 is able to control display of information in a manner that matches the user's current needs according to the selected application.

The functional executor 25, which may be implemented by the instructions of the CPU 101, and at least one of the camera 112, microphone 114, and speaker 115, controls communication of image data or sound data.

The detector 26, which may be implemented by the instructions of the CPU 101, analyzes image data based on an image captured by the camera 112 or sound data based on a sound input by the microphone 114, to detect the presence of a user who is in a detection area of the terminal 10. The detection area is an area where an image can be captured and/or a sound can be collected. In case a detection device capable of detecting the user presence is connected to the external device I/F 118, such external detection device may function as the detector 26. In such case, the detector 26 may not be provided in the terminal as long as the detection result is sent to the terminal 10.

The data processor 29, which may be implemented by the instructions of the CPU 101 and the SSD 105, or the instructions of the CPU 101, stores various data in the memory 1000 or reads various data from the memory 1000.

<Functional Configuration of Management System>

Referring to FIG. 6, the management system 50 includes a transmitter/receiver 51, an authenticator 52, a manager 53, a session control 58, and a data processor 59. These elements correspond to a plurality of functions of hardware elements in FIG. 4, which operate according to the instructions of the CPU 101 (FIG. 4) that are generated according to the communication management program read from the RAM 203 onto the HD 204. The management system 50 further includes a memory 5000, which may be implemented by the HD 204. The memory 5000 stores, for each application being managed by the management system 50, application ID and application icon data. The memory 5000 further stores a plurality of databases (DBs) as described below.

(Authentication Management Table)

FIG. 7B is an illustration of an example data structure of an authentication management table. The memory 5000 stores an authentication management DB 5001, which may be implemented by the authentication management table of FIG. 7B. In the authentication management table, for each one of the terminals 10 managed by the management system 50, the contact ID and the password are stored in association with each other. The contact ID is any information for identifying a communication destination in the communication system 1. Examples of contact ID include, but not limited to, terminal identification information for identifying the terminal 10 such as the terminal ID, and identification information for identifying a user of the terminal 10 such as a user account. In the following, it is assumed that the terminal identification information is used as the contact ID of the terminal 10. Further, in the following, it is assumed that the terminal 10aa is assigned with the contact ID "01aa", and the terminal 10db is assigned with the contact ID "01 db".

(Terminal Management Table)

FIG. 7C is an illustration of an example data structure of a terminal management table. The memory 5000 stores a terminal management DB 5002, which may be implemented by the terminal management table of FIG. 7C. The terminal management table of FIG. 7C stores, for each one of the plurality of terminals 10 managed by the management system 50, the contact ID of the terminal 10, the counterpart name (terminal name) of the terminal 10 when serving as a communication destination of the other terminal, the state of the terminal 10, an IP address assigned to the terminal 10, and the function information indicating a function of the terminal 10, in association with one another.

(Application Use Permission Management Table)

FIG. 7D is an example data structure of an application use permission management table (application use management table). The memory 5000 stores an application use management DB 5003, which may be implemented by the application use management table of FIG. 7D. The application use management table stores, for the contact ID that identifies each one of the terminals 10 managed by the management system 50, an application ID that identifies each one of a plurality of applications installed on the terminal 10, and use permission information indicating whether use of the application is allowed ("ON") or not allowed ("OFF") by the terminal 10. For example, the application use management table of FIG. 7D indicates that, for each one of the terminals 10aa and 10ac, four applications respectively having the application IDs "a001", "a002", "a003", and "a004" are installed. For each one of the terminal 10aa and the terminal 10ac, applications with the application IDs "a001" and "a002" are allowed.

<Functional Configuration of Management System>

Next, referring back to FIG. 6, functional configuration of the management system 50 will be described in detail. In the following description of functional configuration of the management system 50, relationships of the elements in FIG. 4 with functional configuration of the management system 50 in FIG. 6 is also described.

The transmitter/receiver 51, which may be implemented by the instructions of the CPU 201 and the network I/F 209, transmits or receives various data (or information) to or from each terminal, device, or system through the communication network 2.

The authenticator 52, which may be implemented by the instructions of the CPU 201, searches the authentication management table (FIG. 7B) using a contact ID and a password received at the transmitter/receiver 51 as a search key, to authenticate the terminal 10 based on determination of whether the same contact ID and password are managed in the authentication management table.

The manager 53, which may be implemented by the instructions of the CPU 201, updates the terminal state, etc., in the terminal management table of FIG. 7C to keep updated such as the terminal state in the terminal management table of FIG. 7C.

The session controller 58, which may be implemented by the instructions of the CPU 201, controls a session through which content data is transmitted between the terminals 10. Examples of control include, but not limited to, control to establish a session, control to enable the terminal 10 to participate in the established session, and control to end the session.

The data processor 59, which may be implemented by the instructions of the CPU 201 and the HDD 205, or the instructions of the CPU 201, stores various data in the memory 5000 or reads various data from the memory 5000.

<Operation of Communication System>

Now, operation performed by the communication system 1 is explained according to an example embodiment of the present invention.

Figure 8:
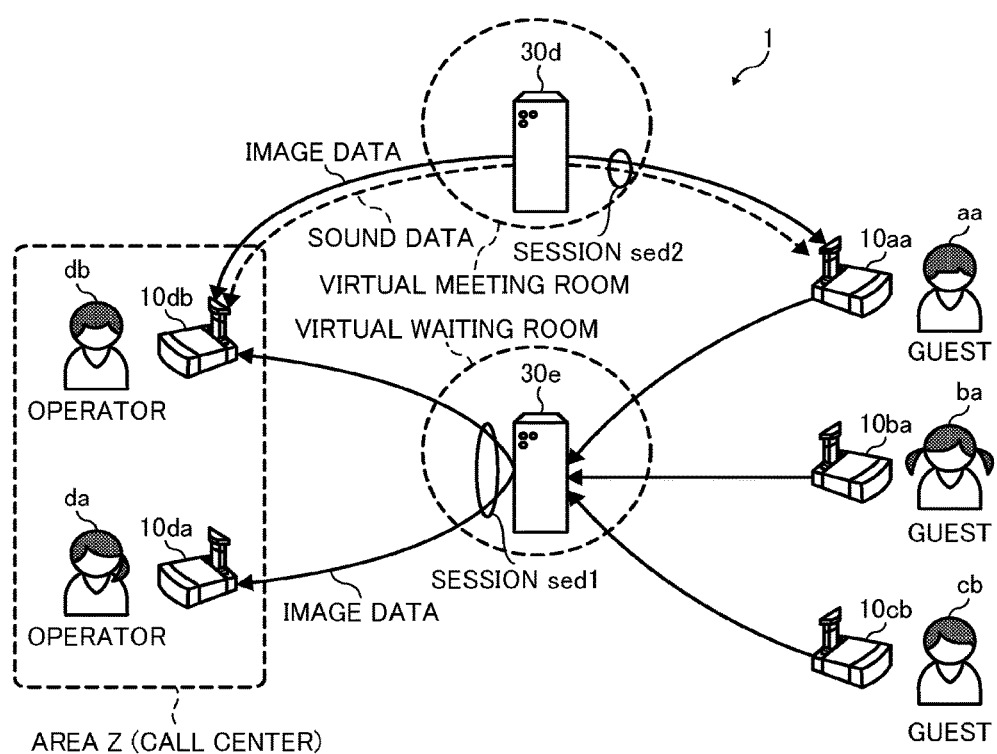
FIG. 8 is a conceptual diagram illustrating transmission or reception of various data in the communication system of FIG. 1.

Referring to FIG. 8, a concept of operation performed by the communication system 1 according to the embodiment is described. FIG. 8 is a conceptual diagram illustrating transmission or reception of various data in the communication system 1. In FIG. 8, it is assumed that the terminals 10aa, 10ba, and 10cb are each operated by a guest, and the terminals 10db and 10da are each operated by an operator.

In the communication system 1, sessions are established among the terminals 10aa, 10ba, 10cb, 10db, and 10da for transmission of image data. For simplicity, these sessions are collectively referred to as a first session "sed1". The relay device 30e relays image data at least between two of the terminals 10aa, 10ba, 10cb, 10da, and 10db. In the first session sed1, the terminals 10aa, 10ba, and 10cb are controlled such that image data from any one of the terminals 10aa, 10ba, and 10cb is transmitted to the relay device 30e. In contrary, the terminals 10da and 10db at the call center in the area Z are controlled such that image data is not transmitted from any one of the terminals 10da and 10db to the relay device 30e in the first session sed1. Accordingly, the operator at each of the terminals 10da and 10db is able to view an image transmitted from the guest at any one of the terminals 10aa, 10ba, and 10cb through the relay device 30e. The guest at each of the terminals 10aa, 10ba, and 10cb is not able to view an image of the operator at any one of the terminals 10da and 10b. In the session sed1, since image data is not communicated in both directions, the guests aa, ba, and cb cannot have a videoconference with the operators da and db. More specifically, in this embodiment, the session sed 1 is used as a virtual waiting room for any user at the terminals 10aa, 10ba, and 10cb that are waiting to start two-way communication with any guest at the terminals 10db and 10da.

When the operator db at the terminal 10db selects the guest aa at the terminal 10aa as a communication counterpart, a session for transmitting image data and sound data is established between the terminals 10aa and 10db via a relay device 30d. This session that is established for content data transmission is referred to as the second session sed2. In the session sed2, the terminals 10aa and 10db are respectively controlled, such that image data and sound data from the terminals 10aa and 10db are to be transmitted to the relay device 30d. Accordingly, the terminals 10db and 10aa can start transmitting image data and sound data in both directions such that the operator db at the terminal 10db and the guest aa at the terminal 10aa can start communication. The second session sed2 thus functions as a virtual meeting room, as the terminals 10db and 10aa participate in that session to carry out videoconference. In this embodiment, as long as the first session sed1 and the second session sed2 are different sessions, the same relay device 30 may be used for those sessions.

Figure 9:
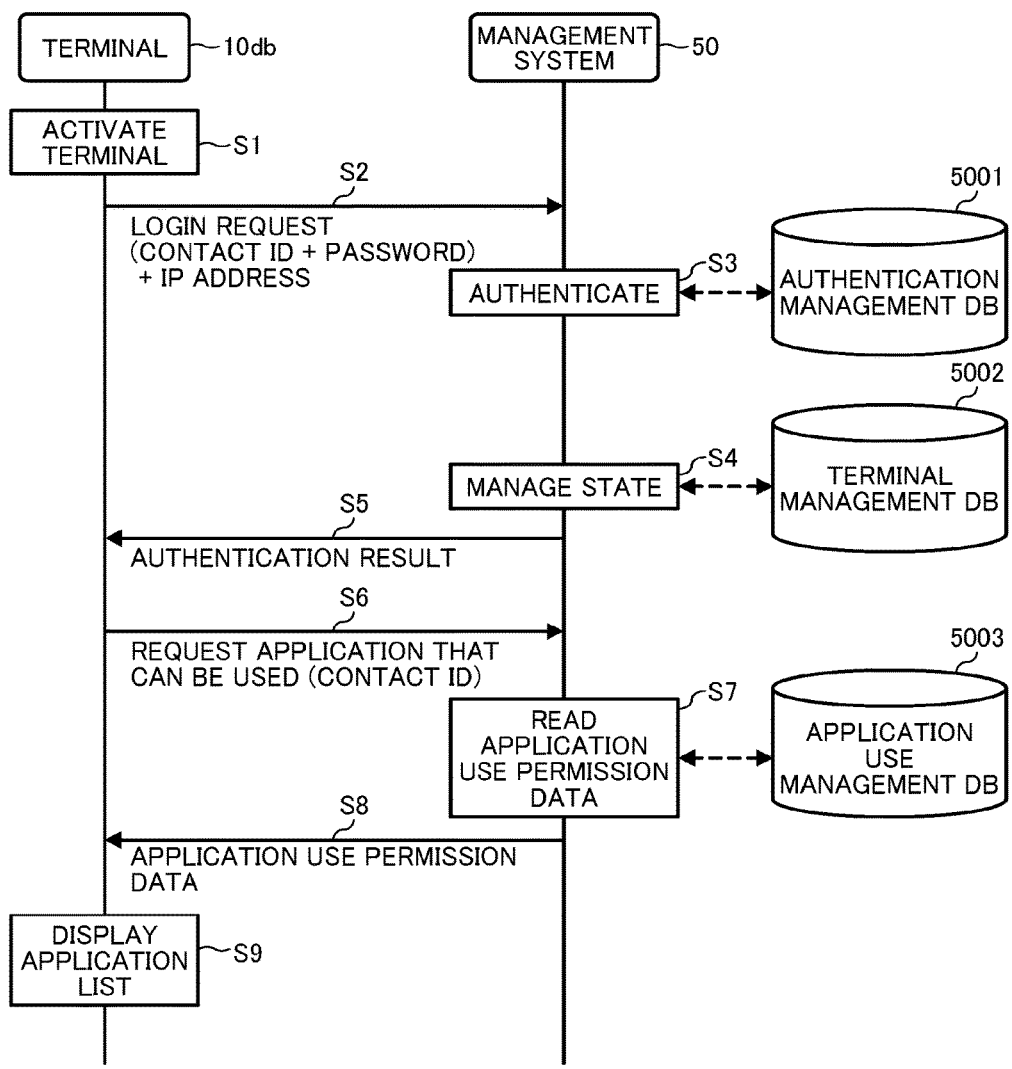
FIG. 9 is a data sequence diagram illustrating operation of preparing for starting communication between terminals.

Referring to FIG. 9, operation from the time when the terminal 10db is activated, to the time when the terminal 10db displays an application list, is explained according to an embodiment of the present invention. FIG. 9 is a data sequence diagram illustrating operation performed by the communication system 1, from the time when the terminal 10db is activated to the time when the terminal 10db displays an application list.

In response to turning on of the power switch 109 by the user, at S1, the operation input acceptor 12 accepts the instruction for turning on, and the terminal 10db is turned on to be activated. In response to receiving turning on operation, at S2, the transmitter/receiver 11 sends a login request to the management system 50 through the communication network 2. The management system 50 receives the login request at the transmitter/receiver 51. The login request includes a contact ID for identifying the terminal 10db that sends the login request, and a password. These contact ID and password are read from the memory 1000 by the data processor 29, and transmitted to the transmitter/receiver 11. Alternatively, the contact ID and password may be input by the user through the operation key 108. Alternatively, the contact ID and password may be read out from the recording medium 106. As the terminal 10*db* sends the login request to the management system 50, the management system 50, which is the receiver side, obtains the IP address of the terminal 10*db* that is the sender side, which may be transmitted with the login request.

At S3, the authenticator 52 of the management system 50 searches the authentication management table of FIG. 7B using the contact ID and password included in the login request as a search key to authenticate the terminal 10*db* based on determination of whether the same contact ID and password are managed in the authentication management table (FIG. 7B). When the authenticator 52 determines that the terminal 10 that sends the login request is an authenticated terminal, at S4, the manager 53 stores, in the terminal management table of FIG. 7*c*, the contact id "01db" of the terminal 10*db*, the state ("waiting"), and the ip address of the terminal 10*db* in association with one another.

At S5, the transmitter/receiver 51 of the management system 50 transmits authentication result information indicating an authentication result, obtained by the authenticator 52, to the terminal 10*db* that sends the login request through the communication network 2. The terminal 10*db* receives the authentication result at the transmitter/receiver 11.

When the authenticator 52 determines that the terminal 10 that sends the login request is an authenticated terminal, at S6, the data transmitter/receiver 11 of the terminal 10*db* sends a request for application use permission data to the management system 50 via the communication network. The application use permission data indicates one or more applications that can be used by the terminal 10*db*. The application use permission data request includes the contact ID of the terminal 10*db*, which sends the request. The management system 50 receives the application use permission data request.

At S7, the data processor 59 of the management system 50 searches the application use management table (FIG. 7D) using the contact ID of the terminal 10*db* that requests for application use permission data as a search key to obtain the application use permission data for the terminal 10*db*.

At S8, the transmitter/receiver 11 transmits application use permission data, which is read at S7, to the terminal 10*db* through the communication network 2. The transmitter/receiver 11 of the terminal 10*db* receives the application use permission data at the transmitter/receiver 11.

Figure 10:
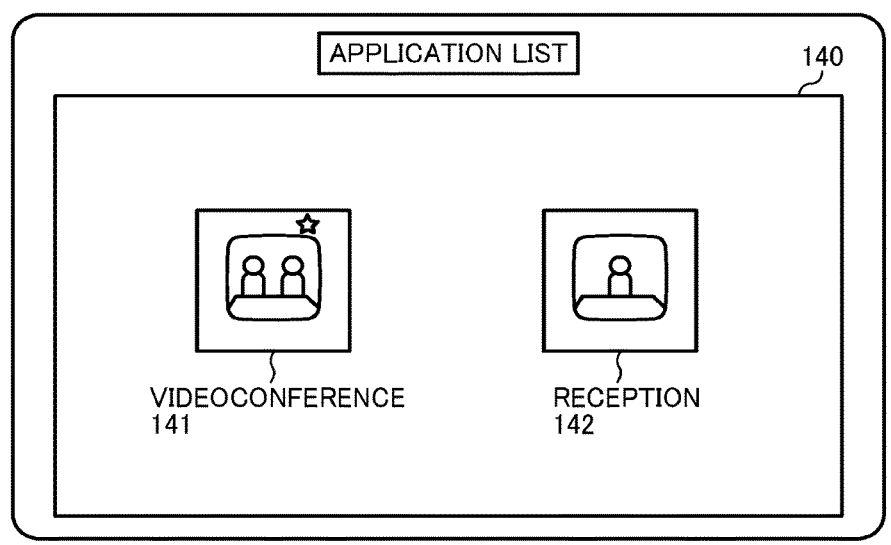
FIG. 10 illustrates an example application list screen.

At S9, the display control 13 causes the display 120*db* to display an application list screen 140, such as that illustrated in FIG. 10. FIG. 10 illustrates an example application list screen. The screen 140 includes, for the respective applications having the application IDs (a001, a002) that are permitted to be used by the terminal 10*db*, application icons (141, 142) corresponding to the applications that can be used.

Referring to FIG. 11, operation of processing a request for participating in the session, which is transmitted from the terminal 10*db* operated by the guest db, is described according to an embodiment of the present invention. In this embodiment, it is assumed that the application icon 142 is selected by the user at the terminal 10*db*. FIG. 11 is a data sequence diagram illustrating operation of participating in the first session sed1, according to an embodiment of the present invention.

In response to a selection of the application icon 142 corresponding to the reception application 1032, from among a plurality of application icons on the screen of FIG. 10, at S21, the operation input acceptor 12 of the terminal 10*db* accepts a selection of application icon by the user. In this example, the user may select the application icon 142 using any one of the operation keys (108*a* to 108*e*).

The operation input acceptor 12 of the device controller 1050 instructs the activator 22, which operates under control of the reception application 1032, to activate the communication controller 1060 according to the reception application 1032. While the above-described steps up to S22 is performed by the device controller 1050, the following steps after S22 is performed by the communication controller 1060 that is activated under control of the reception application 1032.

At S23, the display control 24 of the communication controller 1060 instructs the display 120*db* to display a screen with available functions of the terminal 10 when the terminal 10 operates according to the reception application 1032. In this embodiment, the screen displays the functions "operator" and "guest" as functions of the reception application. The operation input acceptor 12 receives a user input that selects a specific function.

In the following, it is assumed that the operation input acceptor 12 of the terminal 10*db* receives a user input that selects the "operator". At S24, the function executor 25 of the terminal 10*db* newly stores or updates information regarding a function to be performed by the terminal 10*db*, in the memory 1000 of the terminal 10*db* and the memory 5000 of the management system 50. More specifically, the function executor 25 causes the data processor 29 to store in the memory 1000 function information "operator" as a function being performed by the local terminal 10. The function executor 25 further causes the transmitter/receiver 21 to send an instruction to the management system 50 to store function information "operator" as a function being performed by the terminal 10*db*. When the transmitter/receiver 51 of the management system 50 receives the request, the manager 53 causes the data processor 59 to store in the terminal management table (FIG. 7C) the function information "operator" in association with the contact ID "01db" of the terminal 10*db*.

At S25, the data processor 29 of the terminal 10*db* reads out relay device connection data to be used for connecting to the relay device 30*e*, which relays content data in the first session sed1, from the memory 1000. The relay device connection data includes an IP address of the relay device 30*e*, authentication information to be used for authentication, a port number, and a session ID "se01" for identifying the first session "sed1". In this embodiment, the relay device connection data may be stored in a memory of the management system 50, rather than in the memory of the terminal 10. In such case, the terminal 10*db* obtains the relay device connection data from the management system 50 through the network 2.

At S26, the transmitter/receiver 11 of the terminal 10*db* transmits the relay device connection data to the relay device 30*e*, to request for connection with the relay device 30*e*. The terminal 10*db*, which is connected to the relay device 30*e*, is able to participate in the first session sed1.

Figure 12A:
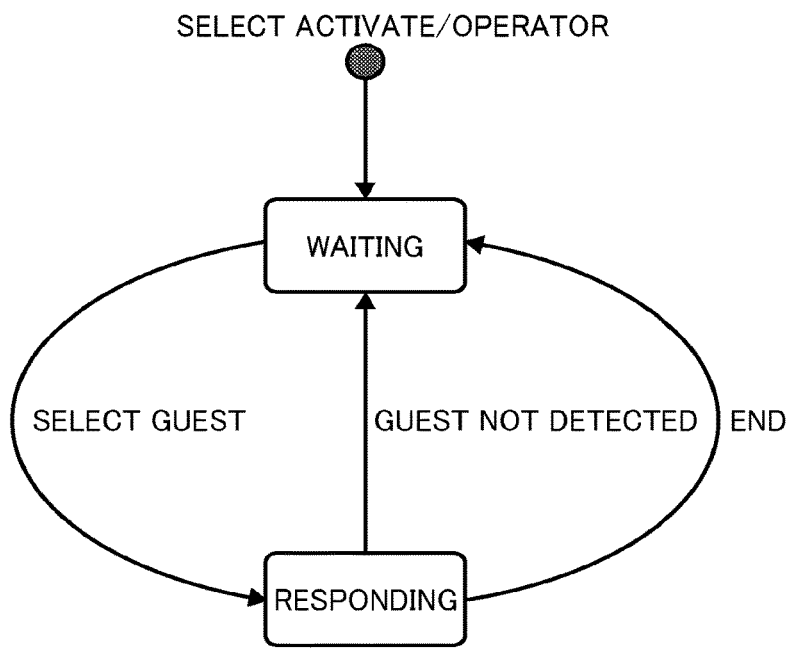
FIGS. 12A and 12B are a conceptual diagram illustrating examples of transition of a terminal state.

At S27, the function executor 25 manages information regarding the state of the local terminal 10*db*. In this embodiment, the state of the terminal 10 as an operator makes transition from one state to another state as illustrated in the diagram of FIG. 12A. FIG. 12A illustrates transition of a state of the terminal 10 as the operator. Referring to FIG. 12A, as the reception application is activated at the terminal 10, and the function "operator" is selected, it is determined that the terminal 10 has the state "waiting". The function executor 25 causes the data processor 29 to store the state "waiting" as the state of the terminal 10*db* at S27. The function executor 25 causes the transmitter/receiver 21 to send to the management system 50 an instruction for managing the state of the terminal 10*db* to be the state "waiting". When the transmitter/receiver 51 of the management system 50 receives the instruction, the manager 53 causes the data processor 59 to store in the terminal management table (FIG. 7C) the state "waiting" in association with the contact ID "01db" of the terminal 10*db*.

At S28, the function executor 25 of the terminal 10*db* controls transmission of content data by the local terminal 10. In such case, the data processor 29 reads out the state information "waiting" (stored at S27) and the function information "operator" (stored at S24) of the local terminal 10 from the memory 1000. The data processor 29 reads out, from the transmission management table (FIG. 7A), the transmission capability "not capable" for image data and the transmission capability "not capable" for sound data, which are associated with the state information "waiting" and the function information "operator". The function executor 25 controls so that the terminal 10*db* does not transmit image data or sound data, based on the transmission capability information "not capable" for image data and sound data. Accordingly, none of image data based on an image captured by the camera 112 of the terminal 10*db* and sound data based on a sound input by the microphone 114 of the terminal 10*db* is transmitted to the counterpart terminal 10 participating in the first session sed1. Thus, content data is not transmitted to any terminal 10 participating in the first session sed1 to wait to communicate with the operator at the terminal 10*db*.

Figure 13:
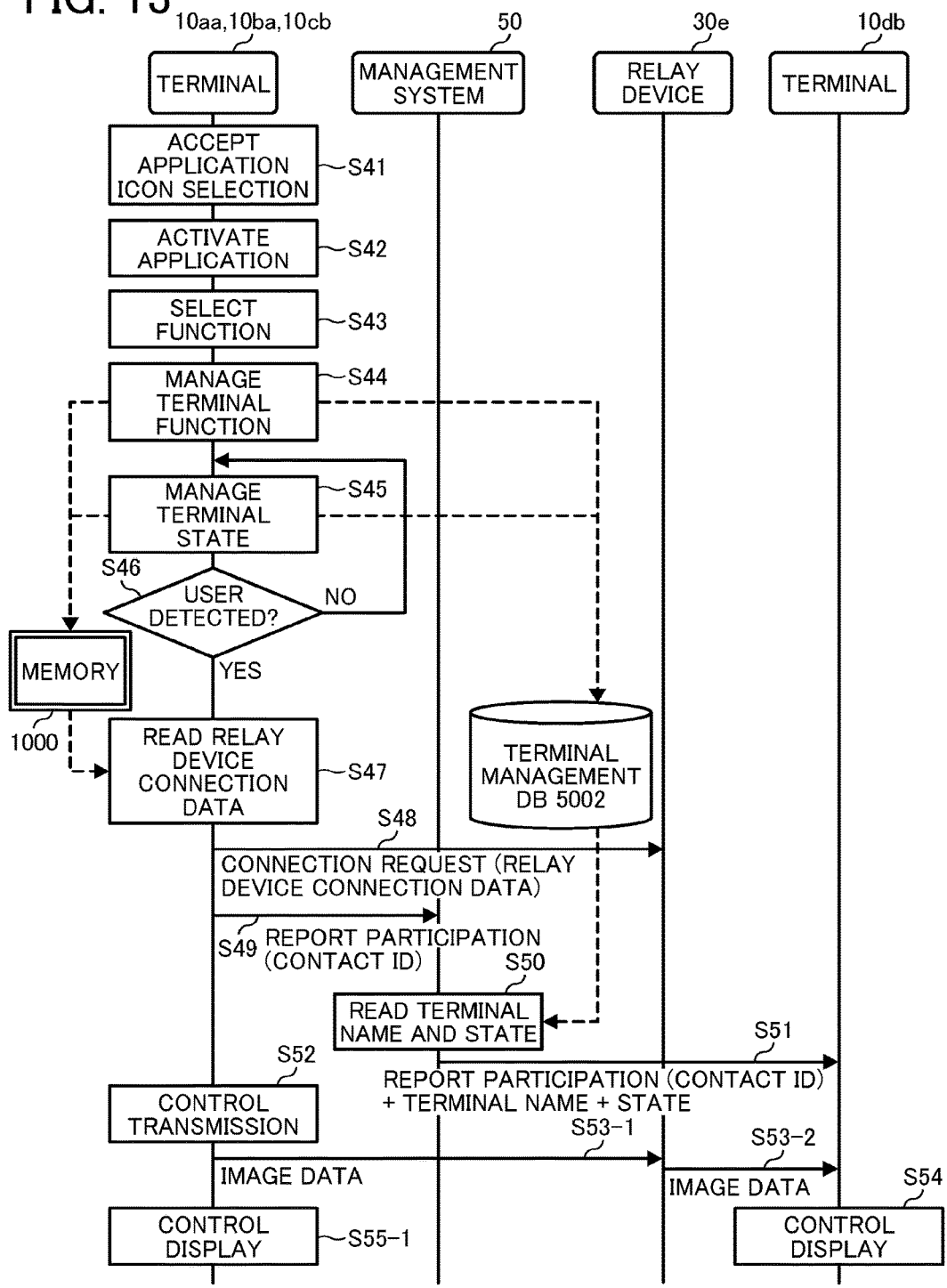
FIG. 13 is a data sequence diagram illustrating operation of processing a request for participating in the first session, according to an embodiment of the present invention.

Referring to FIG. 13, operation of processing a request for participating in the session, which is transmitted from each one of the terminals 10*aa*, 10*ba*, and 10*cb*, operated by the guest aa, guest ba, and 10*cb*, is described according to an embodiment of the present invention. For simplicity, the example case for the terminal 10*aa* is described, as operation is the same for all of the terminals 10 operated by the guest. In this embodiment, it is assumed that the application icon 142 is selected by the user at the terminal 10*aa*. FIG. 13 is a data sequence diagram illustrating operation of participating in the first session sed1, according to an embodiment of the present invention. It is assumed that the terminal 10*aa* and the management system 50 perform S1 to S9 of FIG. 9 such that the display 120*aa* displays an application list screen such as that illustrated in FIG. 10.

In the following, it is assumed that the terminal 10*aa* receives a user selection of the reception application 1032, to perform S41 to S44 in a substantially similar manner as described above referring to S21 to S24. In this example, however, the terminal 10*aa* receives a user selection of the function "guest" at S43. At S44, the terminal 10*aa* stores or updates the function information "guest" in the memory 1000 of the terminal 10*aa* and in the terminal management table (FIG. 7C) of the management system 50, in a substantially similar manner as described above referring to S24 of FIG. 11.

Figure 12B:
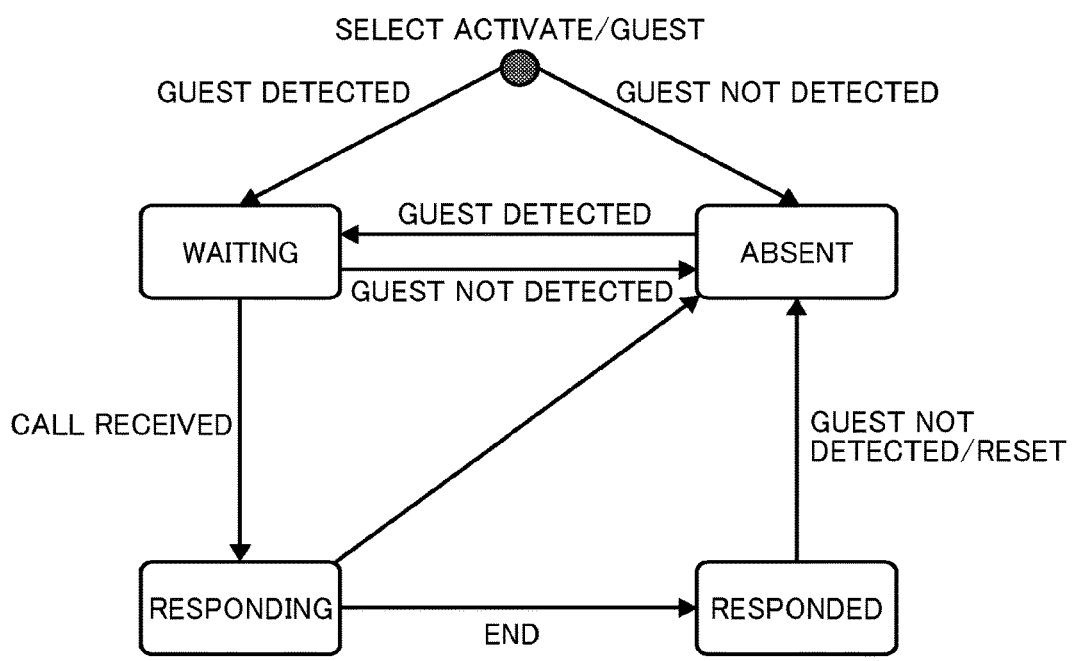

At S45, the function executor 25 manages information regarding the state of the local terminal 10*aa*, in response to detection of the user at the terminal 10*aa* by the detector 26. In this embodiment, the state of the terminal 10 as a guest makes transition from one state to another state as illustrated in the diagram of FIG. 12B. FIG. 12B illustrates transition of a state of the terminal 10 as the guest. Referring to FIG. 12B, as the reception application is activated at the terminal 10 and the function "guest" is selected, presence of the user at the terminal 10 is detected by the detector 26. When the user is detected, it is determined that the terminal 10 has the state "waiting". When the user is not detected, it is determined that the terminal 10 has the state "absent".

Accordingly, the function executor 25 causes the data processor 29 to store the state "waiting" or the state "absent" depending on whether the user is detected, as the state of the terminal 10*aa* in the memory 1000. The function executor 25 causes the transmitter/receiver 21 to send to the management system 50 an instruction for managing the state of the terminal 10*aa* to be the state "waiting" or the state "absent". When the transmitter/receiver 51 of the management system 50 receives the instruction, the manager 53 causes the data processor 59 to store in the terminal management table (FIG. 7C) the state "waiting" or the state "absent" in association with the contact ID "01aa" of the terminal 10*aa*.

When the detector 26 detects the user ("YES" at S46), at S47, the data processor 59 reads the relay device connection data to be used for connecting with the relay device 30*e* from the memory 1000. The relay device connection data includes an IP address of the relay device 30*e*, authentication information to be used for authentication, a port number, and a session ID "se01" for identifying the first session sed1. The first session sed1 functions as a virtual waiting room. In this embodiment, the relay device connection data may be stored in a memory of the management system 50, rather than in the memory of the terminal 10*aa*. In such case, the terminal 10*aa* obtains the relay device connection data from the management system 50 through the network 2.

At S48, the transmitter/receiver 11 of the terminal 10*aa* transmits the relay device connection data to the relay device 30*e*, to request for connection with the relay device 30*e*. The terminal 10*aa*, which is connected to the relay device 30*e*, is able to participate in the first session sed1.

After the terminal 10*aa* participates in the first session sed1, at S49, the transmitter/receiver 21 transmits a notification indicating that the terminal 10*aa* participates in the first session sed1 to the management system 50. This participation notification includes the contact ID "01aa" of the terminal 10*aa*. As the transmitter/receiver 51 of the management system 50 receives the participation notification, at S50, the data processor 59 searches the terminal management table (FIG. 7C), using the contact ID "01aa" of the terminal 10*aa* in the notification as a search key, to obtain the terminal name and the state information associated with the contact ID "01aa". At S51, the transmitter/receiver 51 transmits the participation notification including the contact ID "01aa" of the terminal 10*aa*, and the terminal name and the state information obtained at S50, to the terminal 10*db* identified by the contact ID "01db" associated with the function information "operator" in the terminal management table (FIG. 7C).

At S52, the function executor 25 of the terminal 10*aa* controls transmission of content data by the local terminal 10. In such case, the data processor 29 reads out the state information "waiting" and the function information "guest" of the local terminal 10 from the memory 1000. The data processor 29 reads out, from the transmission management table (FIG. 7A), the transmission capability "capable" for image data and the transmission capability "not capable" for sound data, which are associated with the state information "waiting" and the function information "guest". The function executor 25 controls so that the terminal 10*db* transmits image data but not sound data, based on the transmission capability information "capable" for image data and "not capable" for sound data. Accordingly, at S53-1, image data based on an image captured by the camera 112 of the terminal 10*aa* is transmitted to the relay device 30*e* by the transmitter/receiver 21. At S53-2, the relay device 30e transmits the received image data to the terminal 10db participating in the first session sed1.

Figure 14A:
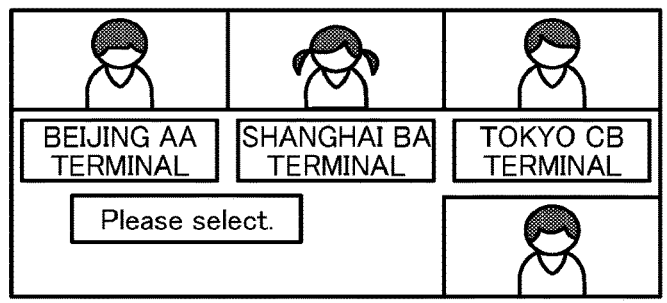
FIGS. 14A to 14E are example display screens.

When the transmitter/receiver 21 of the terminal 10db receives the image data transmitted from the terminal 10aa, at S54, the display control 24 causes the display 120db to display an image based on the received image data. In such case, the display control 24 displays the terminal name received from the management system 50 at S51, and the image data received at S53-2, in association with one another. FIG. 14A is an example screen displayed on the display 120db of the terminal 10db. As the function "guest" is selected, respectively, at the terminals 10ba and 10cb in addition to the terminal 10aa, the terminals 10ba and 10cb respectively transmit image data to the terminal 10db in a substantially similar manner as described above. As illustrated in FIG. 14A, the display control 24 of the terminal 10db displays the respective image data of the terminals 10aa, 10ba, and 10cb, in association with the respective terminal names of the terminals 10aa, 10ba, and 10cb. With this information, the operator at the terminal 10db is able to know that which image of a user corresponds to which terminal 10 indicated by the terminal name.

The display control 24 of the terminal 10db may change a position or a size of an image to be displayed based on image data received from the terminal 10, depending on the state information of the terminal 10 that is transmitted from the management system 50 at S51. For example, the image based on the image data transmitted from the terminal 10 with the state "waiting", may be displayed at a position that can be noticeable or in larger size, than the image based on the image data transmitted from the terminal 10 with the other state, for example, the state "responded".

Figure 14B:
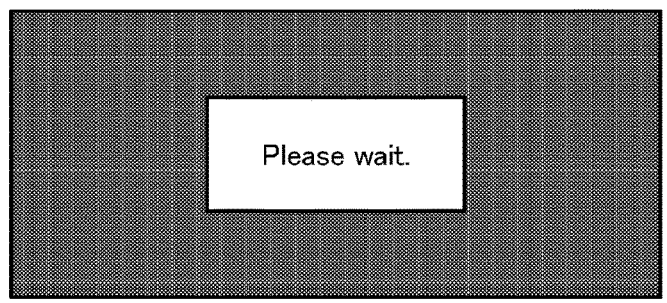

Further, since the terminal 10db controls not to transmit the image data of the terminal 10db to the terminal 10aa (See S28), the image of the operator db at the terminal 10db is not displayed at the terminal 10aa. However, even when image data is transmitted from the terminal 10db or the other terminal 10, the display control 24 of the terminal 10aa operated by the guest aa may control not to output an image based on the received image data, unless the state of the local terminal 10aa indicates "responding" or the local terminal 10aa starts participation in the second session sed2. The display control 24 of the terminal 10aa does not generate an image based on the image data for display on the display 120aa. Instead, the display control 24 of the terminal 10aa outputs a message that requests the guest aa to wait to start communication with the terminal 10db as the operator. FIG. 14B illustrates an example display screen at the display 120aa of the terminal 10aa, with such message "Please wait".

Moreover, content of the screen to be displayed at the terminal 10aa may change, depending on the state information of the terminal 10aa. For example, as illustrated in FIG. 12B, when the state of the terminal 10aa operated by the guest aa makes transition from the state "responding" to the state "responded", the display control 24 of the terminal 10aa may output a message requesting the guest aa at the terminal 10aa to press the reset key. When the reset key is pressed, the state "responded" is changed to the state "absent". In another example, when the state of the terminal 10aa as the guest makes transition to the state "absent", the display control 24 may output a message indicating that the operator is now available for communication. With this message, the user, who returns to the terminal 10aa, is able to know that the operator is available.

Figure 15:
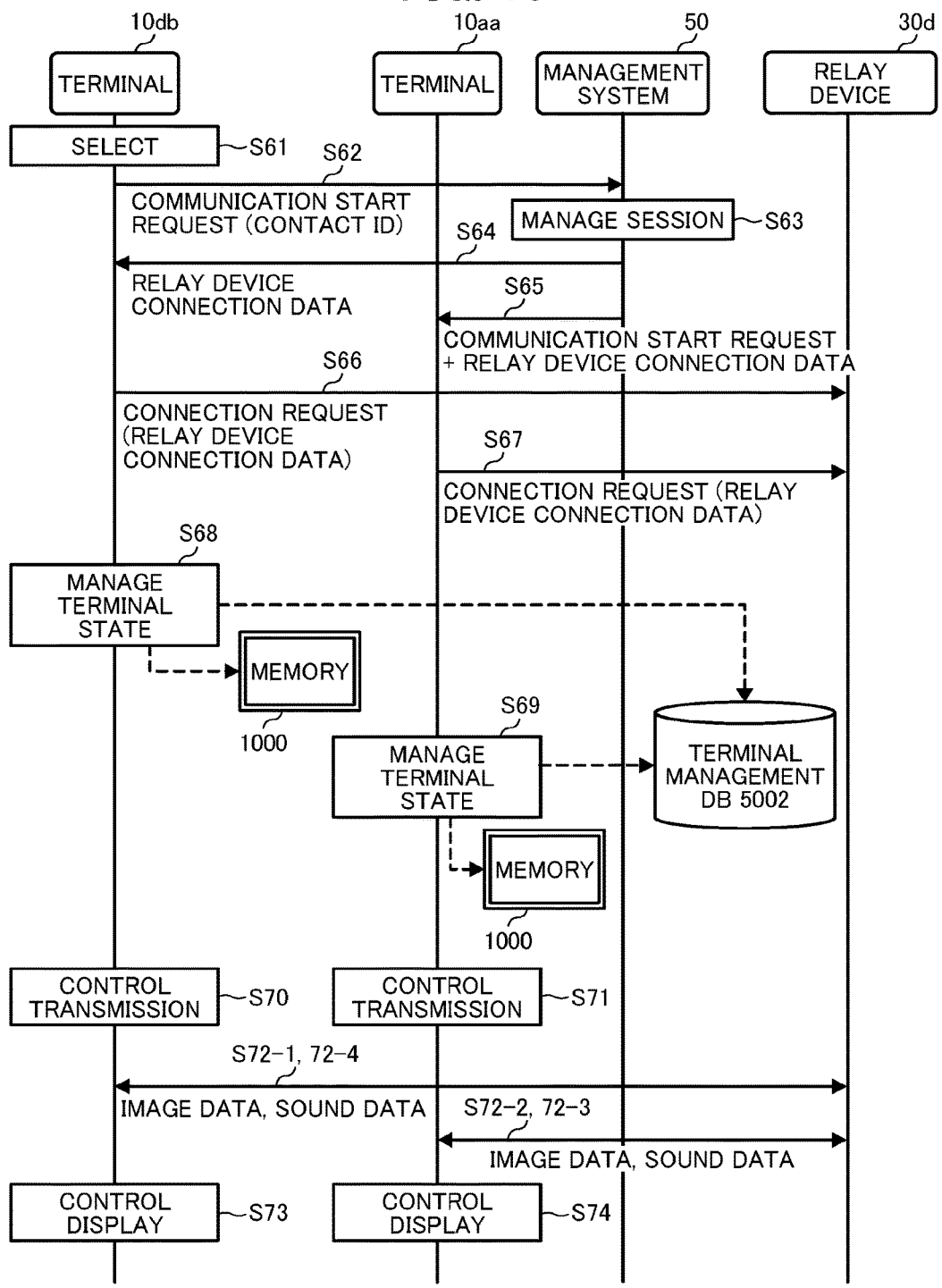
FIG. 15 is a data sequence diagram illustrating operation of processing a request for participating in a second session, according to an embodiment of the present invention.

Referring to FIG. 15, operation of processing participation of the terminals 10aa and 10db in the second session sed2 is described according to an embodiment of the present invention. FIG. 15 is a data sequence diagram illustrating operation of participating in the second session according to the embodiment.

At S61, the operation input acceptor 12 of the terminal 10db accepts a selection of the terminal name by the operator db, from among the terminal names being displayed on the screen of FIG. 14A, as a counterpart terminal to start communication. In the following, it is assumed that the terminal 10aa is selected as a counterpart of the terminal 10db. At S62, the transmitter/receiver 21 of the terminal 10db transmits a communication start request for requesting to start communication with the selected counterpart terminal 10aa, to the management system 50. The communication start request includes the contact ID "01aa" of the selected counterpart terminal 10aa.

As the transmitter/receiver 51 of the management system 50 receives the communication start request, at S63, the session control 58 selects a relay device 30 to relay content data in the second session sed2. In this example, it is assumed that the relay device 30d is selected. Further, at S63, the session control 58 generates a session ID "se02" for identifying the second session sed2.

At S64, the transmitter/receiver 51 transmits the relay device connection data to be used for connecting with the selected relay device 30d, to the terminal 10db that sends the communication start request. The relay device connection data includes the IP address of the relay device 30d, authentication information to be used for authentication, a port number, and the session ID "se02" for identifying the second session sed2. The relay device connection data may be previously stored in the memory 5000 of the management system 50, or may be generated at S63. At S65, the transmitter/receiver 51 transmits the communication start request transmitted from the terminal 10db and the relay device connection data to the terminal 10aa.

At S66, the transmitter/receiver 21 of the terminal 10db transmits the relay device connection data transmitted from the management system 50 to the relay device 30d, to request for connection with the relay device 30d. Accordingly, the terminal 10db connects with the relay device 30d, to establish the second session sed2 between the terminal 10db and the relay device 30d. At S67, the transmitter/receiver 21 of the terminal 10aa transmits the relay device connection data transmitted from the management system 50 to the relay device 30d, to request for connection with the relay device 30d. Accordingly, the terminal 10aa connects with the relay device 30d, to establish the second session sed2 between the terminal 10aa and the relay device 30d.

At S68, the function executor 25 of the terminal 10db manages state information of the local terminal 10db. S68 may be performed at any desired time after the terminal 10 as a counterpart terminal is selected at S61. More specifically, in this example, the function executor 25 of the terminal 10db changes the state information of the local terminal 10db, which is stored in the memory 1000 of the terminal 10db, from the state "waiting" to the state "responding". The function executor 25 causes the transmitter/receiver 21 to send to the management system 50 an instruction for managing the state of the terminal 10db to be the state "responding". When the transmitter/receiver 51 of the management system 50 receives the instruction, the manager 53 causes the data processor 59 to store in the terminal management table (FIG. 7C) the state "responding" in association with the contact ID "01db" of the terminal 10db.

Similarly, at S69, the function executor 25 of the terminal 10aa manages the state of the local terminal 10aa according to the diagram of FIG. 12B, in response to receiving the communication start request from the terminal 10db via the management system 50 at S65. More specifically, in this example, the function executor 25 of the terminal 10aa changes the state information of the local terminal 10aa, which is stored in the memory 1000 of the terminal 10aa, from the state "waiting" to the state "responding". The function executor 25 causes the transmitter/receiver 21 to send to the management system 50 an instruction for managing the state of the terminal 10aa to be the state "responding". When the transmitter/receiver 51 of the management system 50 receives the instruction, the manager 53 causes the data processor 59 to store in the terminal management table (FIG. 7C) the state "responding" in association with the contact ID "01aa" of the terminal 10aa.

At S70, the function executor 25 of the terminal 10db controls transmission of content data by the local terminal 10db. In such case, the data processor 29 reads out the state information "responding" and the function information "operator" of the local terminal 10db from the memory 1000. The data processor 29 reads out, from the transmission management table (FIG. 7A), the transmission capability "capable" for image data and the transmission capability "capable" for sound data, which are associated with the state information "responding" and the function information "operator". The function executor 25 controls so that the terminal 10db transmits image data and sound data to the relay device 30d, based on the transmission capability information "capable" for image data and sound data. Accordingly, at S72-1, image data based on an image captured by the camera 112 of the terminal 10db and sound data based on a sound input by the microphone 114 are respectively transmitted to the relay device 30d by the transmitter/receiver 21. At S72-4, the relay device 30d transmits the received image data and sound data to the counterpart terminal 10aa participating in the second session sed2.

Similarly, at S71, the function executor 25 of the terminal 10aa controls transmission of content data by the local terminal 10aa. In such case, the data processor 29 reads out the state information "responding" and the function information "guest" of the local terminal 10aa from the memory 1000. The data processor 29 reads out, from the transmission management table (FIG. 7A), the transmission capability "capable" for image data and the transmission capability "capable" for sound data, which are associated with the state information "responding" and the function information "guest". The function executor 25 controls so that the terminal 10aa transmits image data and sound data to the relay device 30d, based on the transmission capability information "capable" for image data and sound data. Accordingly, at S72-2, image data based on an image captured by the camera 112 of the terminal 10aa and sound data based on a sound input by the microphone 114 are respectively transmitted to the relay device 30d by the transmitter/receiver 21. At S72-3, the relay device 30d transmits the received image data and sound data to the counterpart terminal 10db participating in the second session sed2.

As the terminals 10db and 10aa respectively receive the image data transmitted from the counterpart terminals 10aa and 10db, at S73 and S74, the display controls 24 of the terminals 10db and 10aa respectively display images based on the received image data on the displays 120. Similarly, as the terminals 10db and 10aa respectively receive the sound data transmitted from the counterpart terminals 10aa and 10db, at S73 and S74, the CPUs 101 of the terminals 10db and 10aa respectively outputs sounds based on the received sound data through the speakers 115.

Figure 14C:
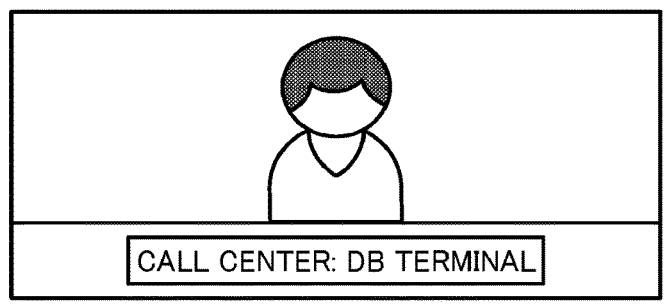
Figure 14D:
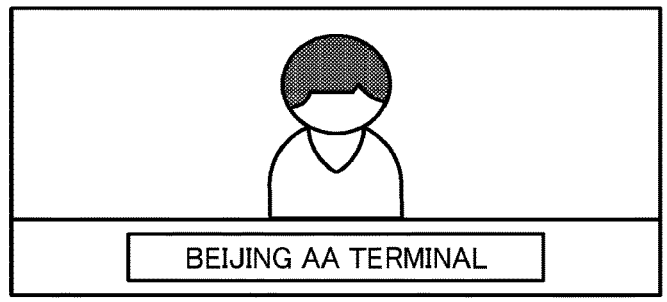

FIG. 14C illustrates an example display screen at the display 120aa of the terminal 10aa. The display 120aa displays an image of the operator db, as a communication counterpart of the user as the guest at the terminal 10aa. FIG. 14D is an example screen displayed on the display 120db of the terminal 10db. The display 120db displays an image of the guest aa, as a communication counterpart of the user as the operator at the terminal 10db.

Figure 14E:
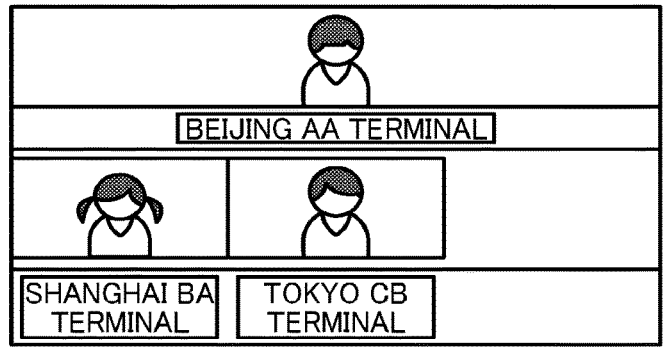

In case the terminal 10db is participating in the first session sed1 and the second session sed2 at the same time, the image based on the image data transmitted in the second session sed2 (such as the image of FIG. 14D) and the image based on the image data transmitted in the first session sed1 (such as the image of FIG. 14A) may be displayed in a manner, such that two images can be switched under control of the display control 24. Alternatively, the display control 24 of the terminal 10db may cause the display 120 to simultaneously display the image based on the image data transmitted in the first session sed1 and the image based on the image data transmitted in the second session sed2, while dividing one screen into two sections. FIG. 14E is an example screen displayed on the display 120db of the terminal 10db, which displays the image of the guest aa that is transmitted in the second session sed2 at the upper side and the images of guests baa and cb that are transmitted in the first session sed1 at the lower side. Alternatively, the display control 24 of the terminal 10db may cause two displays 120 to each display the image based on the image data transmitted in the first session sed1, and the image based on the image data transmitted in the second session sed2. Since the image for the first session sed1 and the image for the second session sed2 are displayed, the operator db at the terminal 10db is able to know about how many more guests (terminals) are waiting, while communicating with the guest aa at the terminal 10aa.

Figure 16:
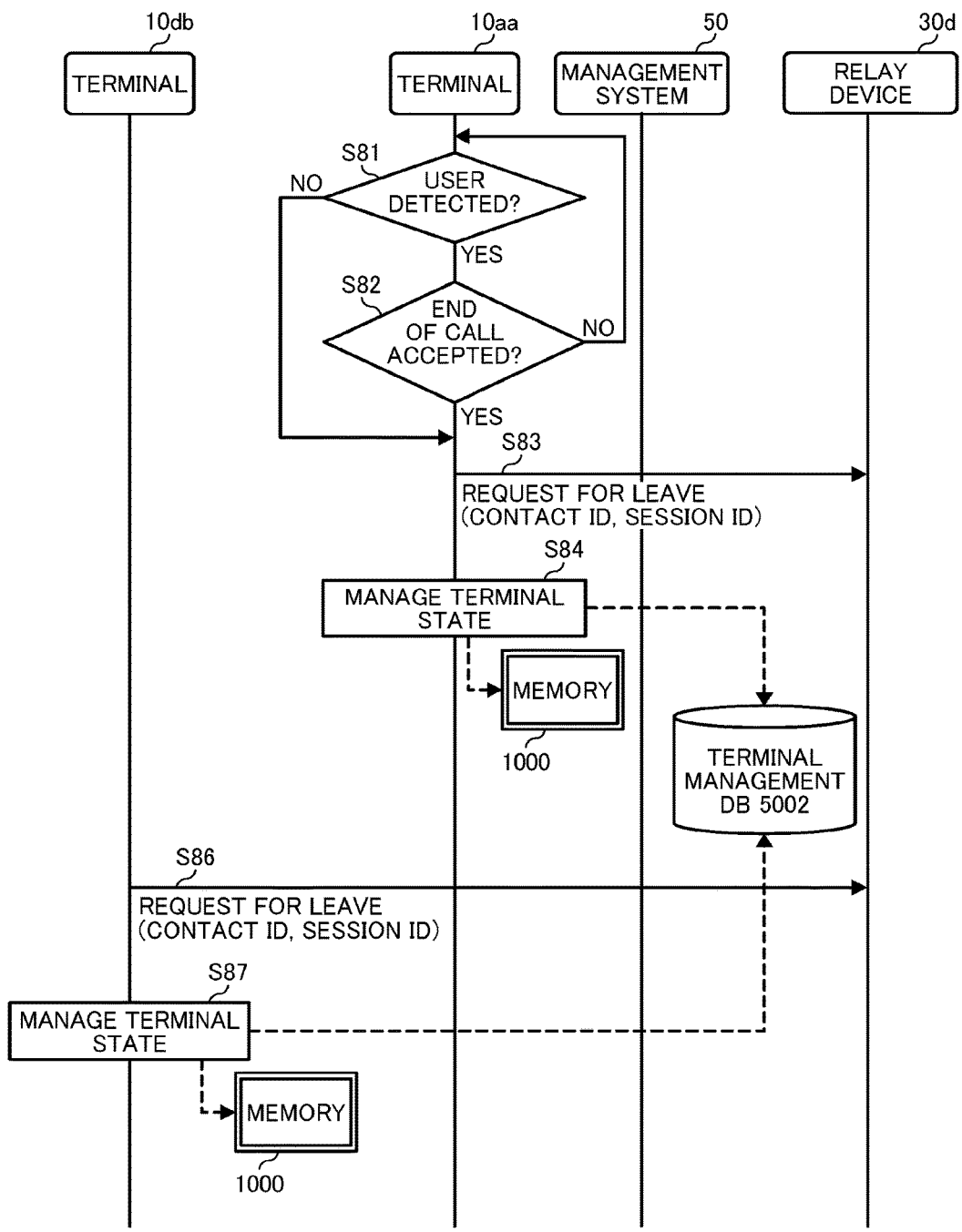
FIG. 16 is a data sequence diagram illustrating operation of processing a request for leaving from the session, according to an embodiment of the present invention.

Referring to FIG. 16, operation of managing a state of the terminal leaving from the second session sed2, is described according to an embodiment of the present invention. FIG. 16 is a data sequence diagram illustrating operation of managing states of the terminals 10aa and 10da leaving from the second session sed2.

At S81, the detector 26 of the terminal 10aa determines whether the user is detected at the terminal 10aa. When it is determined that the user is not detected ("NO" at S81), the operation proceeds to S83. When it is determined that the user is detected ("YES" at S81), the operation proceeds to S82. At S82, the terminal 10aa determines whether a request for ending the call (that is, request for leaving from the session) is received. When it is determined that the request for ending is received ("YES" at S82), the operation proceeds to S83. When it is determined that the request for ending is not received ("NO" at S82), the operation returns to S81. At S83, the transmitter/receiver 21 of the terminal 10aa transmits a request for leaving from the second session sed2 to the relay device 30d. The request for leaving includes the contact ID "01aa" of the local terminal 10aa and the session ID "se02" of the second session sed2. As the terminal 10aa leaves from the second session sed2 in response to the request for leaving, transmission or reception of content data (image data and sound data) between the terminal 10aa and the relay device 30d is stopped.

When the user is not detected at S81 or the request for leaving is accepted at S82, at S84, the function executor 25 of the terminal 10aa manages the state information of the local terminal 10aa according to the diagram of FIG. 12B. More specifically, in this example, the function executor 25 of the terminal 10aa changes the state information of the local terminal 10aa, being stored in the memory 1000 of the terminal 10aa, from the state "responding" to the state "absent" (when the user is not detected) or the state "responded" (when the terminal ends the session). The function executor 25 causes the transmitter/receiver 21 to send to the management system 50 an instruction for managing the state of the terminal 10aa to be the state "absent" or the state "responded". When the transmitter/receiver 51 of the management system 50 receives the instruction, the manager 53 causes the data processor 59 to store in the terminal management table (FIG. 7C) the state "absent" or the state "responded" in association with the contact ID "01aa" of the terminal 10aa.

When the state of the terminal 10aa is changed to the state "responded" at S84, the function executor 25 of the terminal 10aa makes transition from the state "responded" of the terminal 10aa to the state "absent", in response to a detection result of the detector 26 indicating that the user is not detected for a predetermined time period or in response to receiving an instruction for reset at the operation input acceptor 12. Since managing the state of the terminal 10aa is performed in a substantially similar manner as described above referring to S84, description thereof is omitted. The terminal 10aa, which leaves from the second session sed2, may then perform S46. When the user is detected at the terminal 10aa, the terminal 10aa again participates in the first session sed1.

When the user is not detected at the terminal 10aa ("NO" at S81) or when the request for leaving from the terminal 10aa is accepted ("YES" at S82), at S86, the terminal 10db leaves from the second session sed2 in a substantially similar manner as described above referring to S83. More specifically, at S83, the terminal 10db sends a request to leave from the second session sed2 to the management system 50. The terminal 10db may detect presence of a user at the terminal 10aa, or may determine whether a request for leaving from the terminal 10aa is accepted, in various ways. For example, the terminal 10db may receive a notification from the terminal 10aa, or may receive a notification of state information such as the change in state of the terminal 10aa from the management system 50.

At S87, the function executor 25 of the terminal 10db changes the state information of the local terminal 10db, which is stored in the memory 1000 of the terminal 10db, from the state "responding" to the state "waiting". The function executor 25 causes the transmitter/receiver 21 to send to the management system 50 an instruction for managing the state of the terminal 10db to be the state "waiting". When the transmitter/receiver 51 of the management system 50 receives the instruction, the manager 53 causes the data processor 59 to store in the terminal management table (FIG. 7C) the state "waiting" in association with the contact ID "01db" of the terminal 10db. After the terminal 10db as the operator leaves from the second session sed2, if there is one or more terminals 10 that are waiting, the operation returns to S61 of FIG. 15 to accept a selection of the counterpart terminal 10 from the terminals 10 being displayed to start communication.

As described above, in some embodiments, the transmitter/receiver 21 of the terminal 10 operated by an operator (the operator terminal) receives image data (an example of content data), respectively, from one or more terminals 10 operated by guests (the guest terminals) through the first session. In response to a selection of at least one guest terminal 10 from among the one or more guest terminals 10 as a communication counterpart, the operator terminal 10 transmits a request for starting communication with the selected guest terminal 10 through the second session. The function executor 25 of the operator terminal 10 controls transmission of image data from the operator terminal 10. More specifically, the function executor 25 controls such that the operator terminal 10 does not transmit image data to one or more guest terminals 10 through the first session, and further controls such that the operator terminal 10 transmits image data to the selected guest terminal 10 through the second session. With this configuration, before starting communication with the selected guest terminal 10, the operator terminal 10 is able to receive image data transmitted from each one of the guest terminals 10. Based on the received image data of the guest terminals 10, the operator at the operator terminal 10 is able to prepare before starting communication with the guest of the selected terminal.

Further, in some embodiments, the operator terminal 10 stores state information indicating a current state of the operator terminal 10 in a memory. The function executor 25 of the operator terminal 10 controls transmission of content data based on the state information. Accordingly, transmission of content data is controlled based on the current state of the operator terminal 10.

In some embodiments, the operator terminal 10 and the guest terminal 10 each includes the memory 1000 that stores a session ID for identifying the first session sed1, and the transmitter/receiver 21 that transmits a request for connecting with a relay device 30 to relay content data between the operator terminal 10 and the guest terminal 10. The transmitter/receiver 21 requests for relaying, using the session ID of the first session sed1 read from the memory 1000. Since the session ID of the first session sed1 is previously stored, the terminal 10 does not have to request for such information to the management system 50.

In some embodiments, the guest terminal 10 includes the detector 26 that detects presence of a user at the guest terminal 10 to output a detection result. When the detection result indicates the presence of the user, the transmitter/receiver 21 transmits the request for connecting with the relay device 30 to establish the first session sed1. Accordingly, as long as the user is detected at the guest terminal 10, the guest terminal 10 can automatically transmits the request for connecting with the relay device 30e, to the relay device 30e to establish the first session sed1.

In some embodiments, the guest terminal 10 and the guest terminal 10 each requests for connecting with the relay device 30d to establish the second session sed2, using a session ID that is generated in response to receiving the selection of the guest terminal 10. Since the session ID is newly generated for the second session sed2 after the guest terminal 10 to be communicated is selected, the relay device 30 that is most suitable to a location of the selected guest terminal 10 or a number of selected guest terminals 10 may be selected.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the terminal 10 may be implemented by one or more computers, which is capable of communicating content data. Further, any memory in the communication system may be provided in any desired terminal, device, or apparatus.

The relay devices 30, the management system 50, the program providing system 90, and the maintenance system 100 in the above-described embodiment may be configured by a single computer or a plurality of computers to which divided portions (functions) are arbitrarily allocated. In the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a CD-ROM storing the terminal control program, the relay device control program, or the communication management program in the above-described embodiment, the HD 204 storing these programs (separately or entirety), and the program providing system 90 including the HD 204 are used as program products in the case of providing the terminal control program, the relay device program, and the communication management program to users within a certain country or outside that country.

In the above-described embodiment, the terminal management table of FIG. 7B stores the terminal IP address, as terminal identification information. Alternatively, the fully qualified domain name (FQDN) of each terminal 10 may be managed as long as an FQDN serves as terminal identification information for identifying each terminal 10 on the communication network 2. In this case, an IP address corresponding to an FQDN is obtained by a Domain Name System (DNS) server.

In the above-described embodiment, a videoconference system is used as an example of the communication system 1 (including 1A and 1B). Alternatively, the communication system may be a car navigation system. In such case, the terminal 10 at one end may correspond to a car navigation system mounted on one automobile, and the terminal 10 at the other end may correspond to a management terminal or a management server at the management center for managing the car navigation system, or a car navigation system mounted on the other automobile.

The other examples of the communication system 1 include a teleconference system, a personal computer image sharing system, a telephone system including the Internet Protocol (IP) phone, Internet phone, or mobile phone. In the telephone system, the telephone operates as the communication terminal 10.

In addition, although image data and sound data are described as examples of content data in the above-described embodiment, the content data is not limited to these items of data. The content data is preferably used as a medium of real-time communication. Examples of content data include, but not limited to, image data such as a still image or a video image, sound data, and streaming data such as shared screen data, message, stroke data, or instruction or operation data. Alternatively, the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

Further, in some embodiments, when the communication system 1 is used as a remote medical diagnosis system, the content data may be sound data that reflects pulse or beat generated within a human body, image data of electrocardiogram, coordinate data that shows a trend in body temperature, or any other data that may be used to examine the patient.

Note that the terminal 10 may be used not only for communication between different offices or for communication between different rooms in the same office, but also for communication within the same room or for outdoor-indoor communication or outdoor-outdoor communication. In the case where the terminal 10 is used outside, wireless communication using a mobile phone communication network or the like is performed.

In addition, although the case in which a videoconference is held by the communication system 1 has been described in the above-described embodiment, the embodiment is not limited to this case. The communication system 1 may be used in meetings, general conversation between family members or friends, or one-way presentation of information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication terminal, comprising:
a receiver configured to receive first content data transmitted, respectively, from one or more counterpart communication terminals through a first session established with the one or more counterpart communication terminals, the first session being a one-way communication session; and
processing circuitry configured to,
receive a selection of a counterpart communication terminal from among the one or more counterpart communication terminals as a selected counterpart communication terminal,
start communication with the selected counterpart communication terminal through a second session when the counterpart communication terminal has been selected, the second session being a two-way communication session different from the one-way communication session,
prohibit bi-directional transmission of the first content data between the communication terminal and the one or more communication terminals through the first session, and
allow bi-directional transmission of second content data between the communication terminal and the selected communication terminal through the second session after the second session is established with the selected communication terminal,
wherein the first content data is image data and the second content data is image and sound data.

2. The communication terminal of claim 1, further comprising:
a memory configured to store state information indicating a current state of the communication terminal,
wherein the processing circuitry determines whether to allow transmission of first or second content data based on the state information.

3. The communication terminal of claim 2, wherein the state information of the communication terminal changes according to a user operation on the communication terminal.

4. The communication terminal of claim 2, wherein the state information of the communication terminal changes according to a detection result indicating presence of the user at the selected counterpart communication terminal.

5. The communication terminal of claim 1, further comprising:
a transmitter configured to transmit a request for connecting with a relay device configured to relay first content data between the communication terminal and the one or more counterpart communication terminals through the first session, using first session identification information for identifying the first session previously stored in a memory of the communication terminal.

6. The communication terminal of claim 1, wherein the receiver is configured to receive second content data from the selected communication terminal through the second session after the second session is established, to carry out two-way communication with the selected communication terminal.

7. The communication terminal of claim 6, wherein the first content data respectively transmitted from the one or more counterpart communication terminals through the first session includes image data respectively captured at the one or more counterpart communication terminals, and
the processing circuitry is configured to display a first display section including one or more images generated based on the image data captured at the one or more counterpart communication terminals, and further display a second display section including an image generated based on the image data captured at the selected communication terminal after the second session is established with the selected communication terminal.

8. The communication terminal of claim 7, wherein the first display section and the second display section are displayed simultaneously or interchangeably.

9. The communication terminal of claim 7, wherein the selected counterpart communication terminal is selected from among the one or more counterpart communication terminals through the first display section.

10. A communication system, comprising:
a first communication terminal; and
a second communication terminal communicable with the first communication terminal through a network,
wherein the first communication terminal includes at least one processor configured to:
receive first content data transmitted, respectively, from one or more counterpart communication terminals through a first session established with the one or more counterpart communication terminals, the first session being a one-way communication session;
receive a selection of a counterpart communication terminal from among the one or more counterpart communication terminals as the second communication terminal that the first communication terminal starts communication through a second session;
start communication with the selected counterpart communication terminal through a second session when the counterpart communication terminal has been selected, the second session being a two-way communication session different from the one-way communication session;
prohibit bi-directional transmission of the first content data between the first communication terminal and the one or more communication terminals through the first session; and
allow transmission of second content data between the first communication terminal and the second communication terminal through the second session after the second session is established between the first communication terminal and the second communication terminal,
wherein the first content data is image data and the second content data is image and sound data.

11. The communication system of claim 10, wherein the first communication terminal further includes:
a memory configured to store state information indicating a current state of the first communication terminal,
wherein the at least one processor determines whether to allow transmission of first or second content data from the first communication terminal leased on the state information.

12. The communication system of claim 10, further comprising:
a relay device configured to relay first content data between the first communication terminal and the one or more counterpart communication terminals, wherein the first communication terminal and the one or more counterpart communication terminals are each configured to transmit a request for connecting with the relay device using first session identification information for identifying the first session, the first session identification information being stored in a local memory of each one of the first communication terminal and the one or more communication terminals.

13. The communication system of claim 12, wherein the first communication terminal and the second communication terminal are each configured to transmit a request for connecting with a relay device configured to relay second content data between the first communication terminal and the second communication terminal through the second session, using second session identification information for identifying the second session being generated and received from a management system after selection of the second communication terminal.

14. The communication system of claim 10, wherein the second communication terminal includes:
   a detector configured to detect presence of a user at the second communication terminal to output a detection result, and
   when the detection result indicates the presence of the user, the second communication terminal automatically transmits a request for connecting with a relay device to establish the first session.

15. A method of controlling transmission of content data, performed by a communication terminal, the method comprising:
   receiving first content data transmitted, respectively, from one or more counterpart communication terminals through a first session established with the one or more counterpart communication terminals, the first session being a one-way communication session;
   receiving a selection of a counterpart communication terminal from among the one or more counterpart communication terminals as a selected counterpart communication terminal that the communication terminal starts communication through a second session;
   starting communication with the selected counterpart communication terminal through the second session when the counterpart communication terminal has been selected, the second session being a two-way communication session that is different from the one-way communication session;
   prohibiting, via processing circuitry, bi-directional transmission of first content data between the communication terminal and the one or more communication terminals through the first session; and
   allowing, via the processing circuitry, bi-directional transmission of second content data between the communication terminal and the selected communication terminal through the second session after the second session is established with the selected communication terminal,
   wherein the first content data is image data and the second content data is image and sound data.

16. The method of claim 15, further comprising:
   storing state information indicating a current state of the communication terminal; and
   determining whether to allow transmission of first or second content data from the communication terminal based on the state information.

17. The method of claim 15, wherein the first content data respectively transmitted from the one or more counterpart communication terminals through the first session includes image data respectively captured at the one or more counterpart communication terminals, the method further comprising:
   displaying a first display section including one or snore images generated based on the image data captured at the one or more counterpart communication terminals; and
   displaying a second display section including an image generated based on the image data captured at the selected communication terminal after the second session is established with the selected communication terminal.

18. The method of claim 15, further comprising:
   controlling other communication terminals that are communicating with the communication terminal to transmit the first content data to a first communication terminal through the first session; and
   controlling the selected communication terminal to transmit the first content data to the first communication terminal through the second session.

* * * * *